(12) United States Patent
Goeringer et al.

(10) Patent No.: US 12,328,229 B2
(45) Date of Patent: *Jun. 10, 2025

(54) SYSTEMS AND METHOD FOR MICRO NETWORK SEGMENTATION

(71) Applicant: CABLE TELEVISION LABORATORIES, INC., Louisville, CO (US)

(72) Inventors: Steven J. Goeringer, Westminster, CO (US); Brian A. Scriber, Lafayette, CO (US); Michael Glenn, Golden, CO (US); Brady Johnson, Madrid (ES); Mark Deazley, Westminster, CO (US); Darshak Thakore, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 398 days.

This patent is subject to a terminal disclaimer.

(21) Appl. No.: 17/728,558

(22) Filed: Apr. 25, 2022

(65) Prior Publication Data

US 2022/0345541 A1 Oct. 27, 2022

Related U.S. Application Data

(63) Continuation of application No. 16/576,747, filed on Sep. 19, 2019, now Pat. No. 11,316,935, which is a
(Continued)

(51) Int. Cl.
*H04L 67/51* (2022.01)
*H04L 41/0895* (2022.01)
(Continued)

(52) U.S. Cl.
CPC ........ *H04L 41/0895* (2022.05); *H04L 41/122* (2022.05); *H04L 41/40* (2022.05);
(Continued)

(58) Field of Classification Search
CPC ..... H04L 67/51; H04L 45/64; H04L 61/5014; H04L 63/0892; H04W 48/18; H04W 88/16
(Continued)

(56) References Cited

U.S. PATENT DOCUMENTS 6,996,714 B1 2/2006 Halasz et al.
7,484,008 B1 1/2009 Gelvin et al.
(Continued)

FOREIGN PATENT DOCUMENTS

WO 2018015425 A1 1/2018

OTHER PUBLICATIONS

Li et al., 2015 IEEE, "Software-Defined Network Function Virtualization: A Survey", pp. 2542-2553 (Year: 2015).*
(Continued)

*Primary Examiner* — Khalil Naghdali
(74) *Attorney, Agent, or Firm* — Josh C. Snider; Snider IP

(57) ABSTRACT

A wireless communication system includes an external provider subsystem and an electronic network subsystem in operable communication with the external provider subsystem. The electronic network subsystem is configured to provide a first microservice and a second microservice different from the first microservice. The wireless communication system further includes an in-home subsystem (i) separate from the external provider subsystem, (ii) in operable communication with the electronic network subsystem, and (iii) including a first micronet and a second micronet different from the first micronet. The first micronet is configured to operably interact with the first microservice, and the second micronet is configured to operably interact with the second microservice. The wireless communication system further includes at least one electronic device con-
(Continued)

figured to operably connect with one of the first micronet and the second micronet.

20 Claims, 20 Drawing Sheets

Related U.S. Application Data continuation-in-part of application No. 16/556,219, filed on Aug. 29, 2019, now Pat. No. 11,277,746, which is a continuation-in-part of application No. 16/120,063, filed on Aug. 31, 2018, now Pat. No. 10,609,016, which is a continuation-in-part of application No. 15/443,855, filed on Feb. 27, 2017, now Pat. No. 10,440,043.

(60) Provisional application No. 62/300,641, filed on Feb. 26, 2016, provisional application No. 62/553,216, filed on Sep. 1, 2017, provisional application No. 62/724,454, filed on Aug. 29, 2018, provisional application No. 62/733,183, filed on Sep. 19, 2018.

(51) Int. Cl.

| | | |
|---|---|---|
| *H04L 41/122* | (2022.01) | |
| *H04L 41/40* | (2022.01) | |
| *H04L 45/64* | (2022.01) | |
| *H04W 48/18* | (2009.01) | |
| *H04W 88/16* | (2009.01) | |
| *H04L 9/40* | (2022.01) | |
| *H04L 43/20* | (2022.01) | |
| *H04L 61/5014* | (2022.01) | |

(52) U.S. Cl.
CPC ............. *H04L 45/64* (2013.01); *H04L 67/51* (2022.05); *H04W 48/18* (2013.01); *H04W 88/16* (2013.01); *H04L 43/20* (2022.05); *H04L 61/5014* (2022.05); *H04L 63/0892* (2013.01)

(58) Field of Classification Search
USPC ......................................................... 713/168
See application file for complete search history.

(56) References Cited

U.S. PATENT DOCUMENTS

| | | | |
|---|---|---|---|
| 9,027,138 | B2 | 5/2015 | Glenn et al. |
| 9,215,075 | B1 | 12/2015 | Poltorak |
| 9,342,661 | B2 | 5/2016 | Cholas et al. |
| 9,419,842 | B1 | 8/2016 | Galliher, III et al. |
| 9,531,835 | B2 | 12/2016 | Wynn et al. |
| 9,686,199 | B2 | 6/2017 | Anand |
| 10,404,752 | B2 | 9/2019 | Apsangi et al. |
| 10,749,796 | B2 | 8/2020 | Dowlatkhah et al. |
| 11,284,258 | B1 | 3/2022 | Wei et al. |
| 11,533,341 | B2 | 12/2022 | Sood et al. |
| 11,671,829 | B1 | 6/2023 | Radhakrishnan et al. |
| 11,683,687 | B2 | 6/2023 | Myers et al. |
| 11,689,524 | B2 | 6/2023 | Arora et al. |
| 11,693,946 | B2 | 7/2023 | Bradley et al. |
| 11,777,917 | B2 | 10/2023 | Erickson et al. |
| 2003/0126233 | A1 | 7/2003 | Bryers et al. |
| 2004/0019786 | A1 | 1/2004 | Zorn et al. |
| 2007/0234419 | A1 | 10/2007 | Shouno |
| 2008/0229399 | A1 | 9/2008 | O'Neil et al. |
| 2010/0100930 | A1 | 4/2010 | King |
| 2010/0235514 | A1 | 9/2010 | Beachem |
| 2010/0262988 | A1 | 10/2010 | Bauer et al. |
| 2011/0143757 | A1 | 6/2011 | Oh et al. |
| 2011/0196837 | A1 | 8/2011 | Savunen et al. |
| 2011/0216709 | A1 | 9/2011 | Noldus |
| 2011/0302248 | A1 | 12/2011 | Garrett et al. |
| 2012/0173356 | A1 | 7/2012 | Fan et al. |
| 2012/0174212 | A1 | 7/2012 | Dart et al. |
| 2012/0210001 | A1 | 8/2012 | Ryerson et al. |
| 2012/0297470 | A1 | 11/2012 | Kwon |
| 2013/0111550 | A1 | 5/2013 | Naveh et al. |
| 2013/0268999 | A1 | 10/2013 | Kiang et al. |
| 2014/0068261 | A1 | 3/2014 | Malek et al. |
| 2014/0123211 | A1 | 5/2014 | Wanser et al. |
| 2014/0162629 | A1 | 6/2014 | Tipton et al. |
| 2014/0281029 | A1 | 9/2014 | Danforth |
| 2014/0283120 | A1 | 9/2014 | Mao et al. |
| 2014/0289515 | A1 | 9/2014 | Sorotokin et al. |
| 2015/0249548 | A1 | 9/2015 | Rasband et al. |
| 2015/0347769 | A1 | 12/2015 | Espinosa et al. |
| 2016/0134488 | A1 | 5/2016 | Straub et al. |
| 2016/0234213 | A1 | 8/2016 | Kim et al. |
| 2016/0350095 | A1 | 12/2016 | Ramachandran et al. |
| 2016/0373319 | A1 | 12/2016 | Littlejohn et al. |
| 2017/0048700 | A1 | 2/2017 | Huang et al. |
| 2017/0308395 | A1 | 10/2017 | Cook et al. |
| 2017/0311368 | A1 | 10/2017 | Kandur Raja et al. |
| 2018/0024537 | A1 | 1/2018 | Chauvet et al. |
| 2018/0034817 | A1 | 2/2018 | Milton et al. |
| 2018/0123932 | A1 | 5/2018 | Shaw et al. |
| 2018/0316730 | A1 | 11/2018 | Schaefer et al. |
| 2019/0021125 | A1 | 1/2019 | Bischinger |
| 2019/0149987 | A1 | 5/2019 | Moore |
| 2020/0394332 | A1 | 12/2020 | Jakobsson et al. |
| 2021/0076216 | A1 | 3/2021 | Hotchkiss et al. |
| 2021/0144517 | A1 | 5/2021 | Bernat et al. |
| 2023/0025898 | A1 | 1/2023 | Kaplan et al. |
| 2023/0141055 | A1 | 5/2023 | Kim et al. |

OTHER PUBLICATIONS

Namal et al., IEEE 2014 Eighth International Conference on Next Generation Mobile Applications, Services and Technologies, SDN Core for Mobility Between Cognitive Radio and 802.11 Networks, pp. 272-281 (Year: 2014).

Ahearne et al., "Software Defined Control of Tunable Optical Transceivers using Netconf and Yang", 2018 European Conference on Networks and Communications (EuCNC): Network Softwarisation (NET) pp. 81-86 (Year: 2018).

Bifulco et al., "A practical experience in designing an OpenFlow controller", 2012 European Workshop on Software Defined Networking, pp. 61-66 (Year: 2012).

Karmakar et al., "On the Design and Implementation of a Security Architecture for End to End Services in Software Defined Networks," 2016 IEEE 41st Conference on Local Computer Networks, pp. 519-522 (Year: 2016).

Medved et al., "OpenDaylight: Towards a Model-Driven SDN Controller Architecture", IEEE Conferences [ Jun. 1, 2014] Proceeding of IEEE International Symposium on a World of Wireless, Mobile and Multimedia Networks 2014 (pp. 1-6) (Year: 2014).

Nguyen et al., "Software-defined model for IoT clusters: enabling applications on demand", 2018 IEEE, pp. 776-781 (Year: 2018).

Boussard et al., 2015 IEEE, 27th International Teletraffic Congress, "Software-Defined LANs for Interconnected Smart Environments", pp. 219-227 (Year: 2015).

Lamb et al., IEEE 2014, 6th International workshop, "Towards Robust Trust in Software Defined Networks," pp. 166-171 (Year: 2014).

Taha Ali et al., 2015 IEEE, Transactions of Reliability, "A Survey of Securing Networks Using Software Defined Networking," pp. 1086-1097 (Year: 2015).

Behrad et al., 2019 IEEE, 22nd Conference on Innovation in Clouds, Internet and Networks, "Network Access Control for the IoT: A Comparison Between Cellular, Wi-Fi and LoRaWAN," pp. 195-200 (Year: 2019).

* cited by examiner

SYSTEMS AND METHOD FOR MICRO NETWORK SEGMENTATION

RELATED APPLICATIONS

This application is a continuation of U.S. application Ser. No. 16/576,747, filed Sep. 19, 2019. U.S. application Ser. No. 16/576,747 is a continuation in part of U.S. application Ser. No. 16/556,219, filed Aug. 29, 2019, now U.S. Pat. No. 11,277,746, issued Mar. 15, 2022. U.S. application Ser. No. 16/556,219 is a continuation in part of U.S. application Ser. No. 16/120,063, filed Aug. 31, 2018, now U.S. Pat. No. 10,609,016, issued Mar. 31, 2020. U.S. application Ser. No. 16/120,063 is a continuation in part of U.S. application Ser. No. 15/443,855, filed Feb. 27, 2017, now U.S. Pat. No. 10,440,043, issued Oct. 8, 2019. U.S. application Ser. No. 15/443,855 claims the benefit of and priority to U.S. Provisional Patent Application Ser. No. 62/300,641, filed Feb. 26, 2016. U.S. application Ser. No. 16/120,063 also claims the benefit of and priority to U.S. Provisional Patent Application Ser. No. 62/553,216, filed Sep. 1, 2017. U.S. application Ser. No. 16/556,219 also claims the benefit of and priority to U.S. Provisional Patent Application Ser. No. 62/724,454, filed Aug. 29, 2018. U.S. application Ser. No. 16/576,747 also claims the benefit of and priority to U.S. Provisional Patent Application Ser. No. 62/733,183, filed Sep. 19, 2018. The disclosures of all of these applications are incorporated herein by reference in their entireties.

BACKGROUND

Network operators have been dealing with infected subscriber's devices for more than 15 years. Many operators have botnet notification and remediation systems in place to identify and mitigate infected devices on their network. A description of such systems is described in RFC 6561 on Recommendations for the Remediation of Bots in ISP Networks. Such systems have been in production since 2005. One patent for identifying infected devices is described in U.S. Pat. No. 9,027,138.

SUMMARY OF THE INVENTION

Dynamic Software Defined Networking (DSDN) can be used to provide network level security protections for different types of devices, such as a network of Internet of Things (IoT) devices or other systems of wired and or wirelessly interconnected devices.

Devices that no longer have security patches or are infected with malware can be either quarantined, or their network traffic can be limited to only approved network destination points.

For devices with strong security, DSDN can be used to create VPN tunnels to add a layer of defense. For example, DSDN could be used to identify a network connected insulin pump with an embedded Public Key Infrastructure (PKI) certificate, look up the appropriate network connects (doctor's office and/or medical cloud), and create a VPN tunnel to the approved network locations.

In an embodiment, a wireless communication system includes an external provider subsystem and an electronic network subsystem in operable communication with the external provider subsystem. The electronic network subsystem is configured to provide a first microservice and a second microservice different from the first microservice. The wireless communication system further includes an in-home subsystem (i) separate from the external provider subsystem, (ii) in operable communication with the electronic network subsystem, and (iii) including a first micronet and a second micronet different from the first micronet. The first micronet is configured to operably interact with the first microservice, and the second micronet is configured to operably interact with the second microservice. The wireless communication system further includes at least one electronic device configured to operably connect with one of the first micronet and the second micronet.

In an embodiment, a wireless communication network includes a first micronetwork, a second micronetwork, and a software defined network controller configured to (i) operate according to a data model application, and (ii) enable communication packets from a first device configured within the first micronetwork to be delivered to a second device configured within the second micronetwork according to the data model application.

In an embodiment, a micronet communication system includes a micronet infrastructure configured to receive advance service information from, and arrange traffic routing and connectivity of, the system. The system further includes a micronet manager in operable communication with the micronet infrastructure and configured to orchestrate service delivery to the system, and a user network in operable communication with the micronet manager and the micronet infrastructure. The user network includes a gateway and a plurality of micronets. The gateway is configured to implement software defined networking (SDN) to automatically segment the plurality of micronets into at least one system-managed micronet and at least one user-managed micronet separate from the system-managed micronet.

BRIEF DESCRIPTION

These and other features, aspects, and advantages of the present disclosure will become better understood when the following detailed description is read with reference to the accompanying drawings in which like characters represent like parts throughout the drawings, wherein.

Figure 1A:
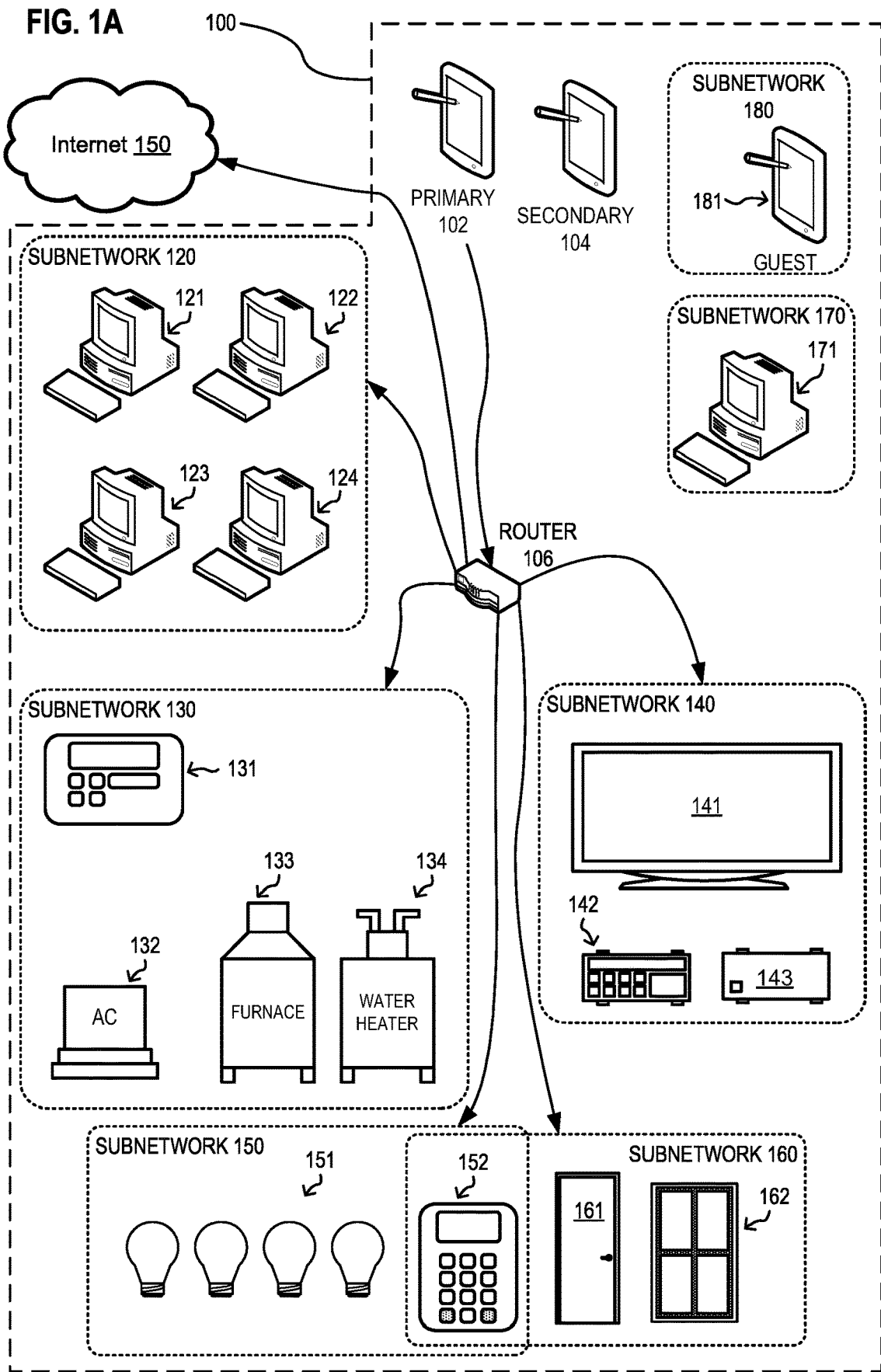
FIG. 1A shows one exemplary Dynamic Software Defined Network (DSDN) connected to the internet, including exemplary subnetworks, and representing primary device communications, in an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION OF THE FIGURES

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used further herein, "CA" may refer to a certificate authority hosting a root certificate, and may further include, without limitation, one or more of a CA computer system, a CA server, a CA webpage, and a CA web service.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The present invention utilizes a subnetwork organization and isolation system and method for protecting computer systems, computing capable devices, and computer networks. This system and method prevents the infections of susceptible devices, dynamically isolates infected devices for administrator notification and manual or automated remediation, and provides for infected devices to remain in use, albeit in a limited fashion, without significant impact to the operator or other devices on the network. Providing for infected devices to remain in use is accomplished by isolating the infected or otherwise vulnerable devices into an isolation subnetwork. One exemplary isolation subnetwork is a limited access subnetwork which only provides for a narrow selection of communications or amount of data to transfer to and/or from the device. Another exemplary isolation subnetwork is a complete isolation subnetwork, which effectively walls of the device from the rest of the network and subnetworks until remediation may occur.

Dynamic Software Defined Networking (DSDN) system can be used to provide bot network level and device level security protections for a wide array of devices and systems, including but not limited to IoT devices, mobile devices, computers, routers, extenders, etc. Devices for which security patches are no longer available or devices that are infected with malicious software, such as malware or botnet software, may be either quarantined or isolated. Alternatively, such devices mayor have their network traffic controlled by the DSDN system, for example, limited to only approved network and subnetwork destination points, to approved network traffic types and/or flows, or by capping the amount of data flow for a predetermined period.

For devices with strong security, DSDN system can be used to create VPN tunnels to add a layer of protection to a devise and devices to which they are connected. In one example, DSDN system identifies a network connected medical device, such as an insulin pump configured with an embedded PKI certificate. The DSDN system determines the appropriate network connects (e.g., a doctor's office and/or a medical cloud), and creates a Virtual Private Networking (VPN) tunnel to the approved network location(s).

In an embodiment, the present DSDN system may create layers of protection for devices by configuring dynamic VPNs to stop malicious traffic from connecting to DSDN system protected devices. Furthermore, privacy is enhanced when utilizing the present DSDN system to preventing the theft of data from snooping devices listening to network traffic. This is accomplished, for example, by isolating devices in a home Wi-Fi environment and by utilizing VPN Tunnels (e.g., GRE or IPSEC). These snooping devices may be standalone devices put in place by a third party or may have been installed by the owner of the network but taken over (e.g., infected with snooping software) by a malicious third party. Such infected devices may be quarantined by the present DSDN systems and methods such that the device's network traffic is partially or completely separated or otherwise isolated from that of other devices on the network and potentially the internet.

If a network operator maintains a botnet notification and remediation system any infected device traffic may be tunneled for an administrator (also called here, "a user") notification and remediation. For infection susceptible devices, for example, that are no longer supported with security patches, the device's network traffic may be dynamically configured to only route to approved locations, one example of which is an over-the-top video provider, the device's manufacturer, etc.

The present technology is not limited to the home use and may also be applied by any network operator and their operation.

The present invention may also provide a customer of a video network operator with an improved broadband experience. For example, for IPTV or over-the-top video services, the present system and method provides functionality to minimize the impact that home network traffic has on the video experience. It may also reduce operating costs associated with infected devices providing a network environment which they may exist in while protecting the rest of the network from infection.

FIG. 1A shows a DSDN 100 (also call "network 100" herein) connected to the internet 190 and including exemplary subnetwork 120-subnetwork 180 (also called "limited access networks"), a router 106, a primary interconnected device 102, and a secondary interconnected device 104. Primary device 102 is pictorially represented as connected to subnetwork 120-subnetwork 160 via router 106. Subnetwork 120 includes four computer systems 121-124. Subnetwork 130 includes a smart thermostat 131, a smart AC unit 132, a smart furnace 133, and a smart hot water heater 134. Intelligence in these (and any other) devices may be integrated upon manufacture or may be added as an add-on post manufacture. Subnetwork 140 includes a smart TV 141, an A/V receiver 142, and an amplifier 143. Subnetwork 150 includes smart light bulbs 151 and a smart hub 152. Subnetwork 160 shares smart hub 152 with subnetwork 150 and includes IoT enabled door 161, and window 162. Any of these devices may include a plurality of IoT or smart devices, for example door 161 may include a smart lock, a smart doorbell, and a smart door opening sensor. Subnetwork 150 and/or subnetwork 160 may also include other smart or IoT devices such as smart light and fan switches, motion detectors, security cameras, moisture detectors, window shades, weather stations, etc., all of which are not shown but are contemplated. Subnetwork 170 includes a computer system 171. Subnetwork 180 includes a guest device 181, such as but not limited to a guest smart phone, guest computer system, or guest tablet.

Communication may come directly from primary device 102 to a subnetwork or a member of a subnetwork, or may be facilitated by networks 100's router 106. In the example of FIG. 1A, DSDN 100 is configured such that primary device 102 may access subnetwork 120-subnetwork 160 via router 106. Secondary device 104 has not been provisioned into network 100, and therefore is not in communication with any device or subnetwork within network 100. Subnetwork 170-subnetwork 180 are shown isolated from all other subnetworks/devices in network 100. That is, there is no communication between isolated subnetworks 170 and 180 and any other device or the internet 190. In one example, for subnetwork 170 this may be that computer device 171 is infected with malicious software. In another example, for subnetwork 180 this may be because guest device 181 is currently not trusted.

In the embodiment of network 100, all devices within a subnetwork may intercommunicate with other devices in the same subnetwork, but are partially or wholly isolated from devices outside their respective subnetwork, unless device or subnetwork is specifically configured to communicate with a device or subnetwork outside the respective subnetwork. One example of a cross subnetwork communication is subnetworks 150 and 160, which share smart hub 152. In this embodiment, smart light bulbs 151 may communicate with smart hub 152 and door 161 and window 162 may communicate with smart hub 152, but smart bulb 151, door 161 and window 162 may not communicate with each other. In a separate embodiment smart hub 152 (or router 106) may act as a policy enforcing intermediary which only allows certain communications between devices in subnetwork 150 and subnetwork 160. Such communications may be maintained in a list of allowed communications on smart hub 152 or router 106 or enforced utilizing known techniques. Another example of cross subnetwork communication is between subnetwork 160 and subnetwork 130. For example, if door 161 and window 162 are open, communication and coordination between subnetworks 160 and 130 may be initiated to heat or cool a home in which network 100 exists. For example, hub 152 may communicate with primary device 102 to notify the user that heating is not optimized due to open windows and or doors.

It will be understood that subnetworks may be organized by device type such that only devices that should communicate with one another do so, and devices that are not designed to communicate with one another do not. For example, subnetwork 130 may be considered an HVAC subnetwork which supports heating and air conditioning smart devices and subnetwork 140 may be considered an Audio/Video subnetwork which supports only AV equipment. If, for example, smart furnace 133 were infected with foreign or malicious software which tried to duplicate itself throughout DSDN 100 the subnetwork structure of DSDN 100 would limit the malicious software to only subnetwork 130. Furthermore, if furnace 133 tried to communicate with receiver 142 for purposes of duplicating itself, then DSDN 100 would note the unusual communication attempt and may initiate an analysis of furnace 133, which may result in further isolation and remediation prior to incorporating furnace 133 back into subnetwork 130.

It will be understood that the present system and method may be implemented on a service provider (e.g., Comcast) implemented DSDN capable system or in a DSDN cloud. DSDN functionality may also be distributed between a service provider the service provider implemented system, the DSDN cloud and the DSDN capable router.

Figure 1B:
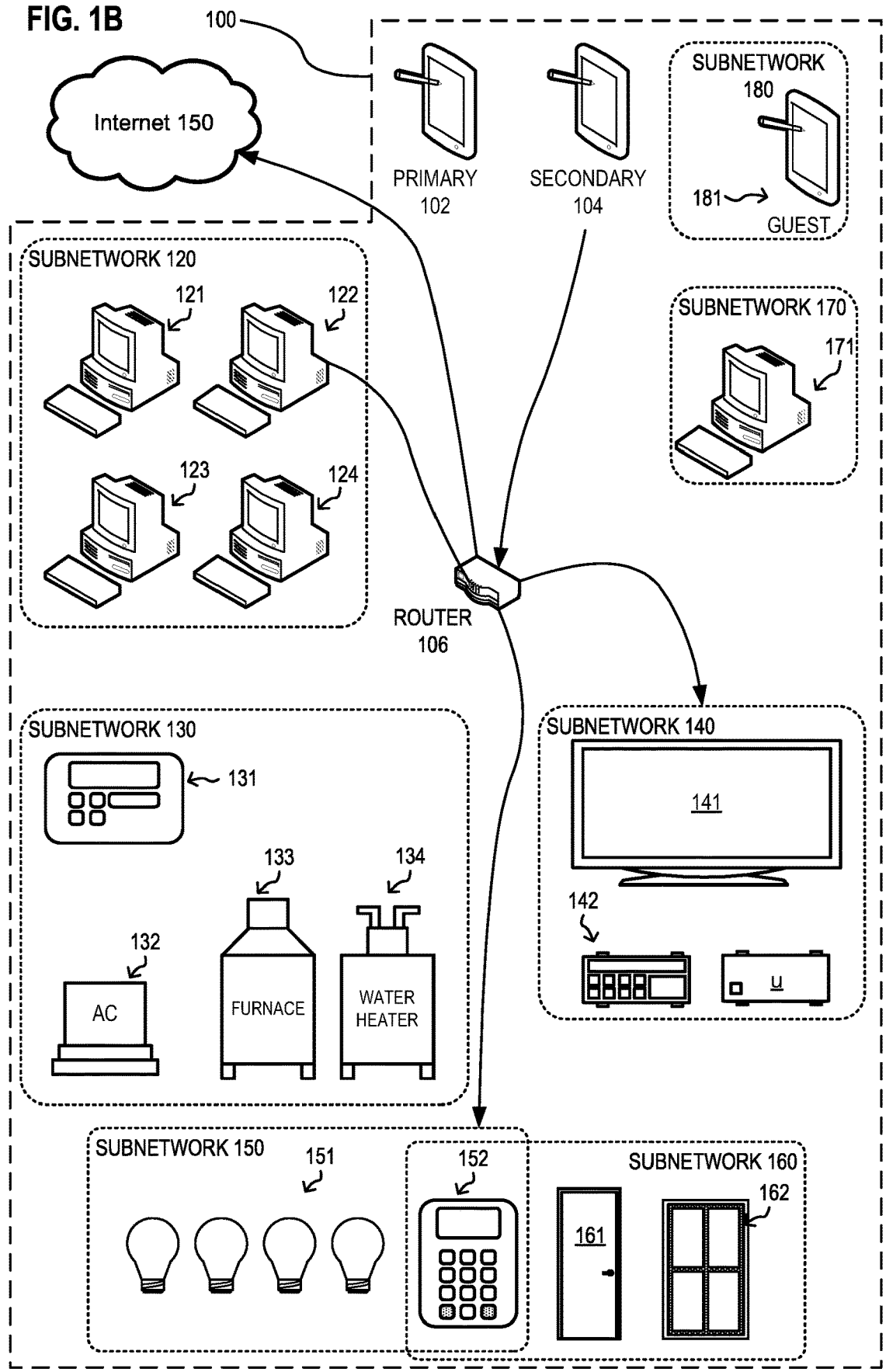
FIG. 1B shows the DSDN of FIG. 1 with secondary device communication connections represented after the provisioning of a secondary device, in an embodiment.

FIG. 1B shows DSDN 100 of FIG. 1 with communication connections for secondary device 104 after device 104 is provisioned into network 100. DSDN 100 provides device 104 with communication to computer 122 of subnetwork 120, to subnetworks 140 and 150, and the internet all via router 106. Secondary device 104 may be, for example, a child who lives in the home in which DSDN 100 in implemented. Because of this, device 104 is not provided access to house hold systems such as the HVAC system supported by subnetwork 130. Furthermore, device 104 is only provided access to computer 122, which may be, for example, the child's computer. It will be understood that DSDN 100 is a dynamic network such that access for device 104 may be changed and that change may be DSDN 100 implemented or may be manually configured by an administrator, for example by the user of primary device 102.

Dynamic reconfiguration of DSDN 100, subnetworks 120-180, and communication access may be triggered by a DSDN operated scheduler. One example of this type of scheduling is primary device 102 programming device 104's access to devices or subnetworks within DSDN 100. This may include restricting device 104's access to AV subnetwork 140 on school nights to after 6 PM. Alternatively, or additionally, device 104's access to devices or subnetworks within DSDN 100 may be event driven. One example of such an event driven control is the submission or upload of the child's homework via device 104 or computer 122 to a homework submission website or server which may cause DSDN 100 to provide device 104 access to AV subnetwork and optionally to provide computer 122 broader access to the internet and access to e-mail, text, etc. Another example is the detection of malicious software on one or more devices of DSDN 100 or within a subnetwork 120-180.

Another example is the notification by a trusted source, e.g., manufacturer of thermostat 131, that a software update is available.

Figure 1C:
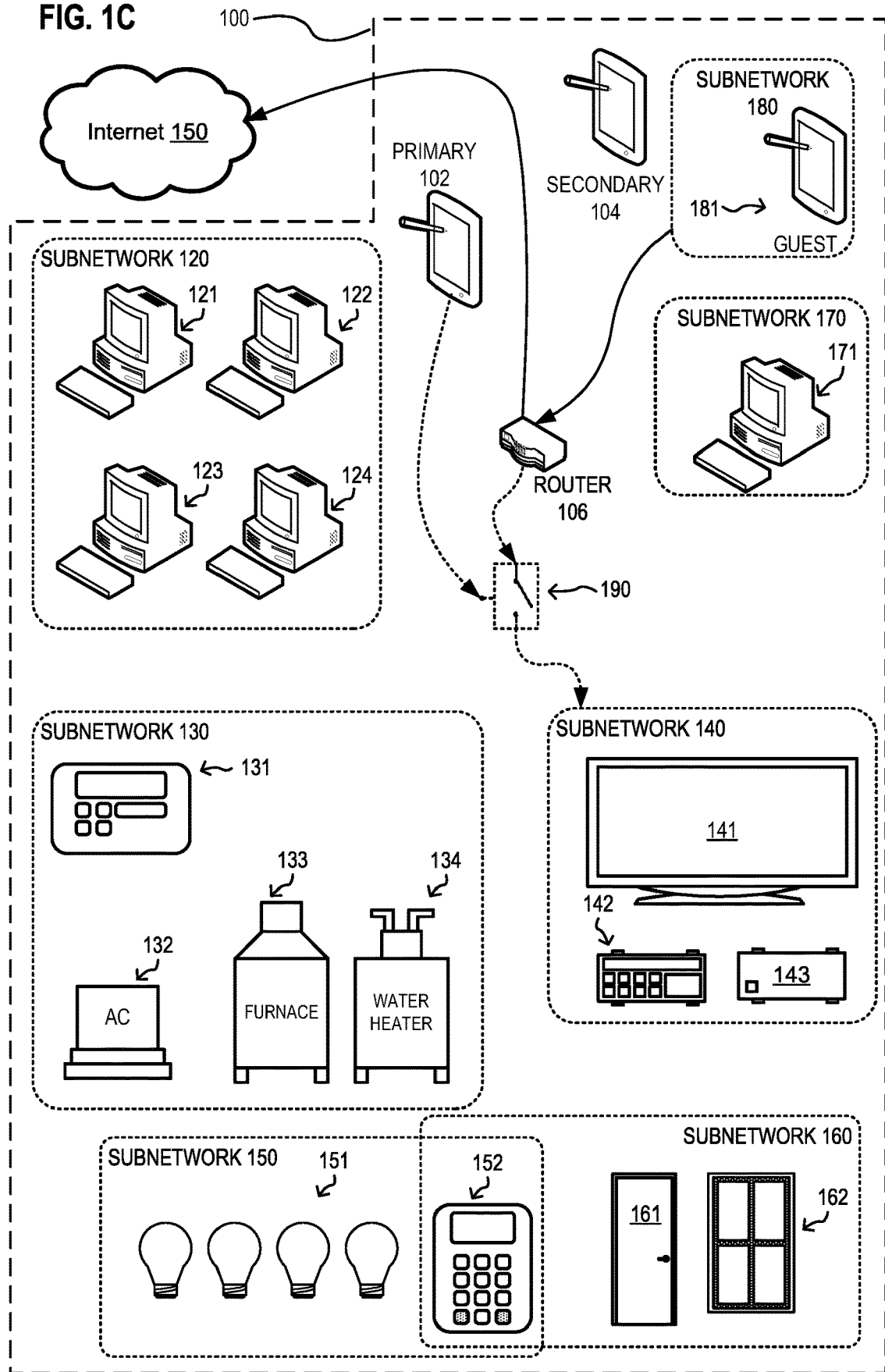
FIG. 1C shows the DSDN of FIG. 1 with guest device communication connections represented after the provisioning of a guest device into the DSDN, in an embodiment.

FIG. 1C shows DSDN 100 of FIG. 1 with communication connections for guest device 181 after guest device 181 on subnetwork 180 is provisioned into DSDN 100. FIG. 1C also includes a symbolically represented switch 190, discussed further below. Because device 181 is a guest device it is provided limited access to DSDN 100 support devices and subnetworks. This is to protect DSDN 100 devices and subnetworks from potential infection that may be introduced by guest device 181. This also protects guest device 181 from any viruses or malicious software that may be on a DSDN 100 device, for example furnace 133.

In FIG. 1C guest device 181 is provided access to the internet 190 and access to AV subnetwork 140. Guest device 181 is provided primary device 102 controlled access to subnetwork 140. Control by primary device 102 is symbolically represented by device 102 controlling switch 190. Switch 190 may be implemented as a physical switch, as software within router 106, or by another system or method that would be apparent to one skilled in the art after reading the present disclosure.

Figure 2:
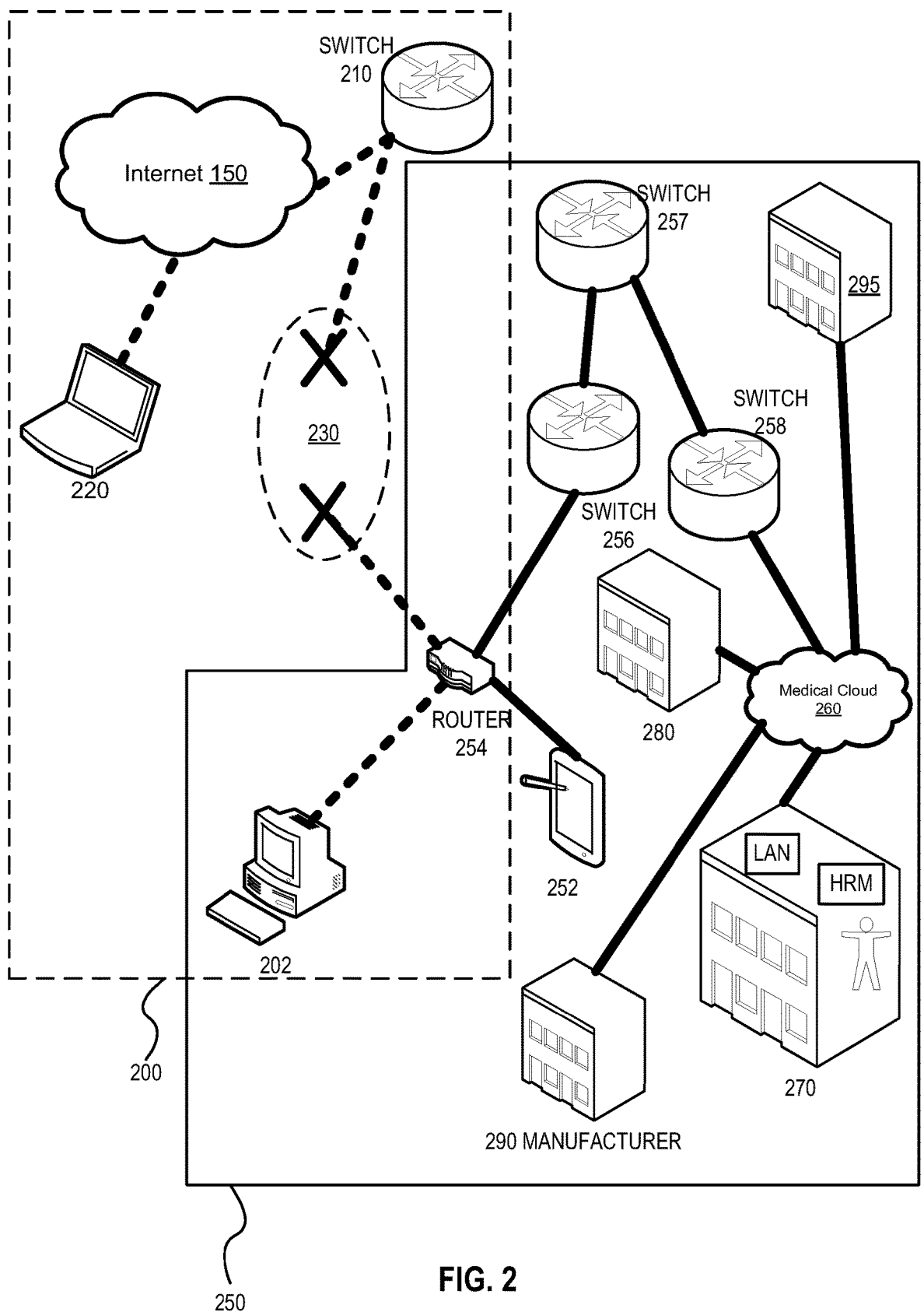
FIG. 2 shows a medical subnetwork in communication with a residence subnetwork, which utilizes a partial isolation protocol, in an embodiment.

FIG. 2 shows two subnetworks, subnetworks 200 and 250, which are examples of subnetworks forming communication subnetworks, such as subnetwork 250, and an isolation subnetworks, such as subnetwork 200.

Both subnetworks 200 and 250 are formed of devices which are in communication via router 254, but are not co-located. In the example of subnetwork 250 a device 252 is in communication with a medical cloud 260, a doctor office 270, a hospital 280, device manufacturer 290, and service provider (e.g., Comcast) via a router 254 and switches 256-258, which together form an isolated subnetwork 250. Such a connection may utilize a VPN to connect a computer 202 and doctor's office 270, thereby forming a new network, not shown. This new network may include medical devices, such as an insulin pump (not shown), which may be controlled or monitored from one or both of medical cloud 260 and doctor's office 270. The present system and method provides for spatially distributed devices to exist on the same secure network (and in some case on different networks) with limited to no risk of the system being compromised by at least reducing the network attack surface.

Subnetwork 200 forms one embodiment of an isolated subnetwork, formed of a computer 202, a switch 210, computer 220, and router 254, which are shared with subnetwork 250. Subnetwork 200 is shown with a symbolic disconnect 230 between switch 210 and router 254, which isolates computer 220 from computer 202 and subnetwork 250. This isolation may be a physical disconnect, for example, implemented by a switch like switch 210, or may be implemented by software, for example, within router 254, a DSDN orchestration, by a VPN tunneling, or by a combination of any of these.

In an alternative embodiment (not shown), computer 220 may be placed in an isolation subnetwork that is separate from one or both of computer 202 and switch 210 and subnetwork 250.

Figure 3:
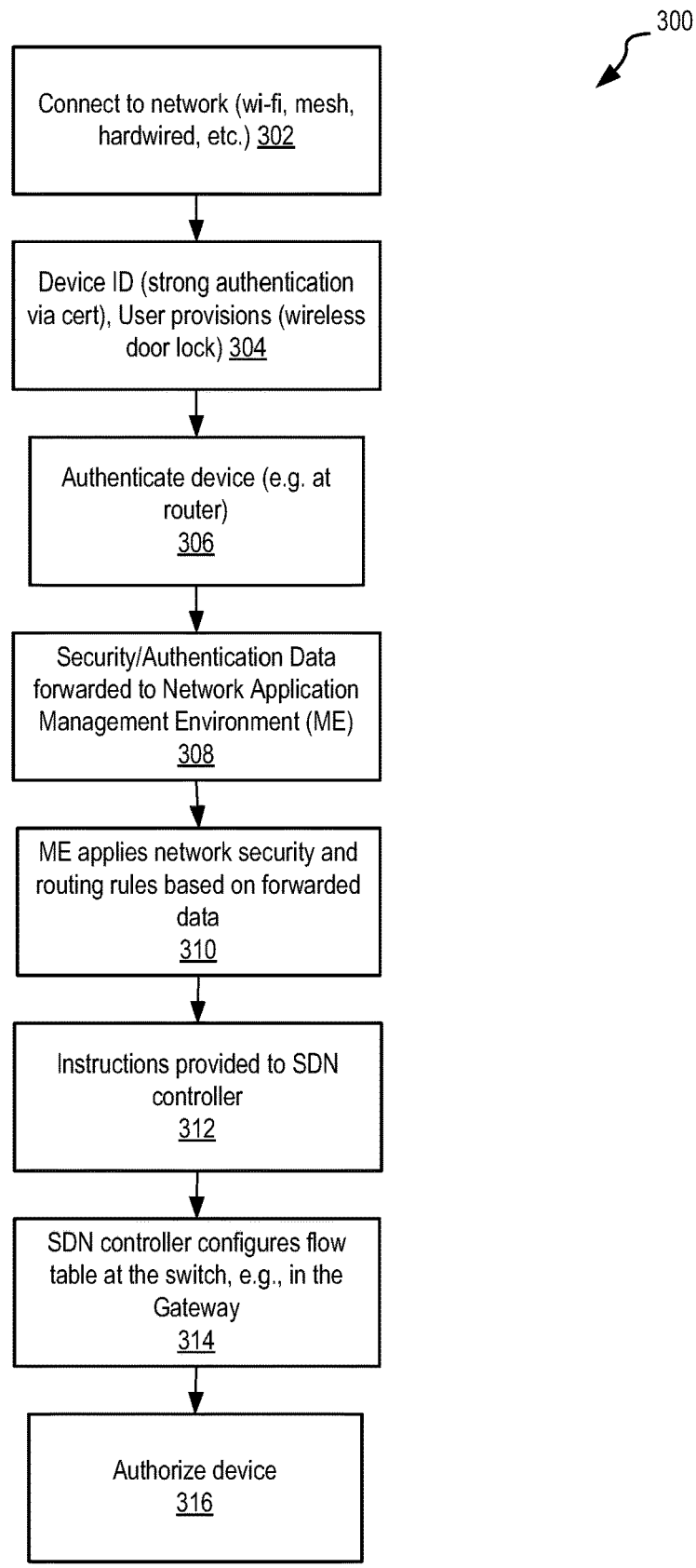
FIG. 3 shows one exemplary provisioning process, in an embodiment.

FIG. 3 shows one exemplary provisioning process 300 for provisioning a new device onto a DSDN.

In step 302 of method 300 a device to be provisioned (hereinafter, "the device") is connected to the network via a wireless or wired connection. One example of step 302 is guest device 181 of FIG. 1C wireless connection to router 106 of DSDN 100.

In step 304 of method 300 authentication data from the device is transferred to a DSDN capable system.

This step may be the transfer of a strong authentication via a cert or may be accomplished by a manual process performed by the administrator of the DSDN. One example of step 304 is transmitting a strong authentication via a certificate or SIM card or user name and password to router 106, the user's service provider, or a DSDN cloud service.

In step 306 of method 300 step 304 data is utilized to authenticate the device. One example of step 306 is DSDN capable router 106 connecting to internet 190 to authenticate guest device 181 via the provided cert.

In step 308 of method 300 the security/authentication data is forwarded to a network application management environment for processing. One example of step 306 is guest device 181's cert, username and password data, or SIM card data being forwarded to router 106, the use's service provider, or a DSDN cloud service.

In step 310 of method 300 the management environment applies network security and routing rules to guest device 181 based on the provided data. One example of step 308 is router 106, the use's service provider, or a DSDN cloud service generating instructions for guest device 181 within network 100 to limit access by guest device 181 to network 100 resources.

In step 312 of method 300 instructions are provided to DSDN controller based on the data provided and processed in the above steps. One example of step 308 is router 106, the use's service provider, or a DSDN cloud service providing the generated instructions to network 100 to implement the instructions.

In step 314 of method 300 a DSDN controller configures a flow table at a switch, e.g., in a gateway or a router. One example of step 312 is a DSDN controller within DSDN capable router 106 configures a flow table within router 106 to control data flow to and from guest device 181.

In step 316 of method 300 the device is authorized. One example of step 316 is guest device 181 being authorized by DSDN capable router 161, the user's service provider, or a DSDN cloud service.

Figure 4:
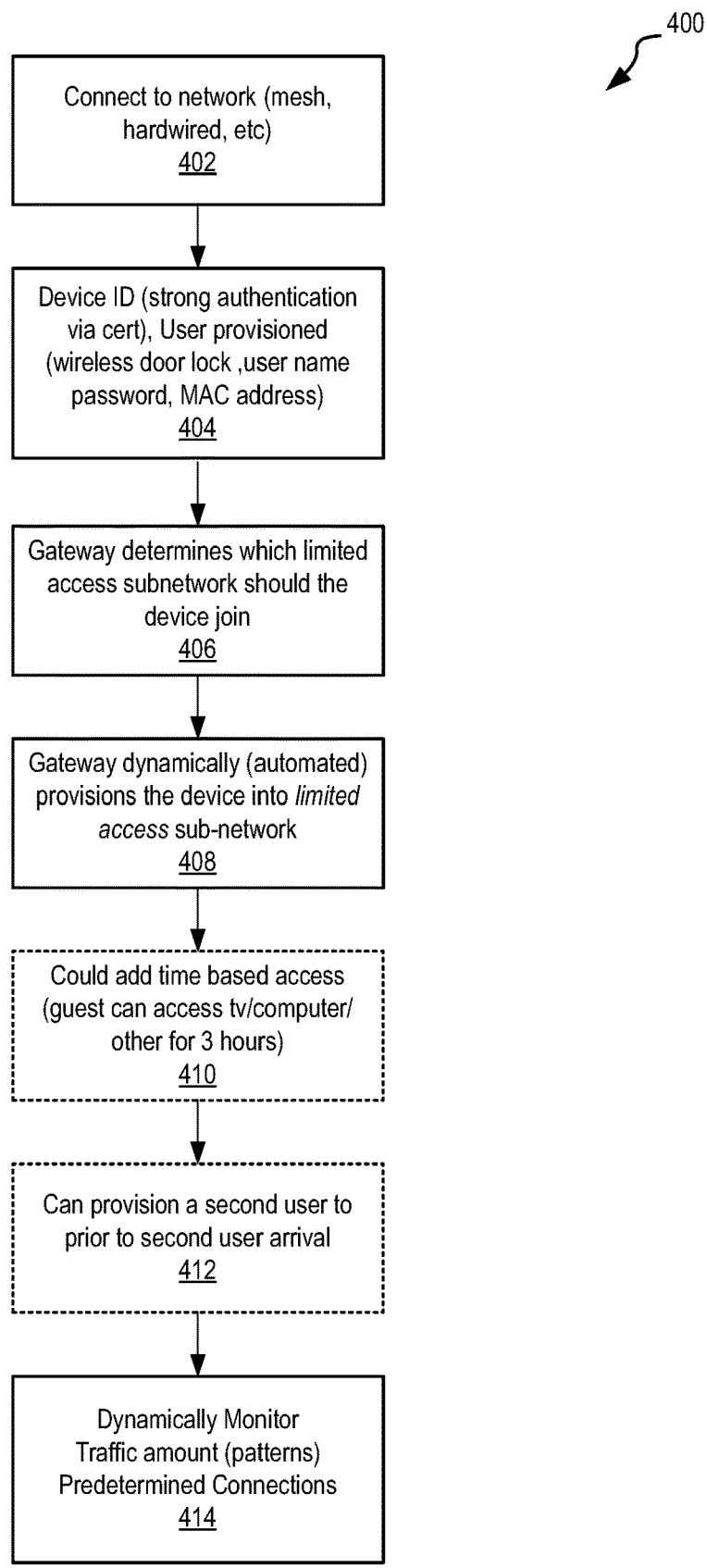
FIG. 4 shows another exemplary provisioning process, in an embodiment.

FIG. 4 shows another exemplary provisioning process, process 400, for provisioning a new device into a DSDN such as DSDN 100 of FIGS. 1A-C. The bulk of the examples here are directed to a wireless door lock.

In step 402 of method 400 a device to be provisioned (hereinafter, "the device") is connected to the network via a wireless or wired connection. One example of step 402 is connecting a wireless door lock associated with door 161 of FIG. 1A to router 106 of DSDN 100.

In step 404 of method 400 authentication data from the device is transferred to the DSDN system, where the authentication data is processed. Transferring authentication data may be automatically or manually transferring a strong authentication via a cert or may be accomplished by an automatic or manual process performed by the administrator of the DSDN, for example, relying on user name and password, MAC address, or some other mechanism known in the art. One example of step 304 is the device transmitting its cert. to the router which in turn forwards the cert to the user's service provider, where the cert is processed and the device is authenticated.

In step 406 of method 400 the user's service provider, a gateway, or some other DSDN capable device determines which limited access subnetwork the new device will exist in. One example of step 306 is DSDN capable router 106 or user's service provider determining that a new door 161 associated door lock will exist within subnetwork 160.

In step 408 of method 400 the DSDN capable device dynamically provisions the device into the step 406 determined limited access subnetwork. One example of step 408 is DSDN capable router 106 associating door 161 associated door lock with subnetwork 160.

In optional step 410 of method 400 the association is given a temporal limitation, for example, the association expires after a predetermined amount of time or can only be accessed by designated devices or user during predetermined time periods. One example of optional step 410 is providing guest device 181 with a time based expiring access to DSDN 100. In another example of step 410, DSDN capable router 106 provides access to AV subnetwork 140 only between 6:00 PM and 7:00 PM on week nights.

In optional step 412 of method 400 the device is provisioned while the device is remote from DSDN 100 and router 106. This provides for the device to have immediate access to resources within DSDN 100 when it is within wireless communication distance from router 106 or when it is plugged into router 106. Examples of optional step 412 include remotely accessing router 106 and/or DSDN 100 to provision door 161 associated wireless door lock at time of purchase or guest device 181 in DSDN 100 or an appropriate subnetwork.

In step 414 of method 400, DSDN dynamically monitors traffic amount and/or patterns to predetermined connections to ensure proper functioning and to determine the presence of undesired software within the DSDN. One example of step 414 is DSDN capable router 106 monitoring all traffic within DSDN 100 to if traffic amounts and patterns vary that that expected the be DSDN configured devices. If it is determined that traffic amounts and/or patterns do vary from that expected, DSDN capable router 106 may initiate an analysis of the infringing device to confirm the presence of malicious software. If malicious software is found, remediation process are activated, such as isolating the device to an newly generated isolation subnetwork, which restricts or eliminates traffic flow depending on the necessity of the device. Malicious software removal steps may also be taken.

Figure 5:
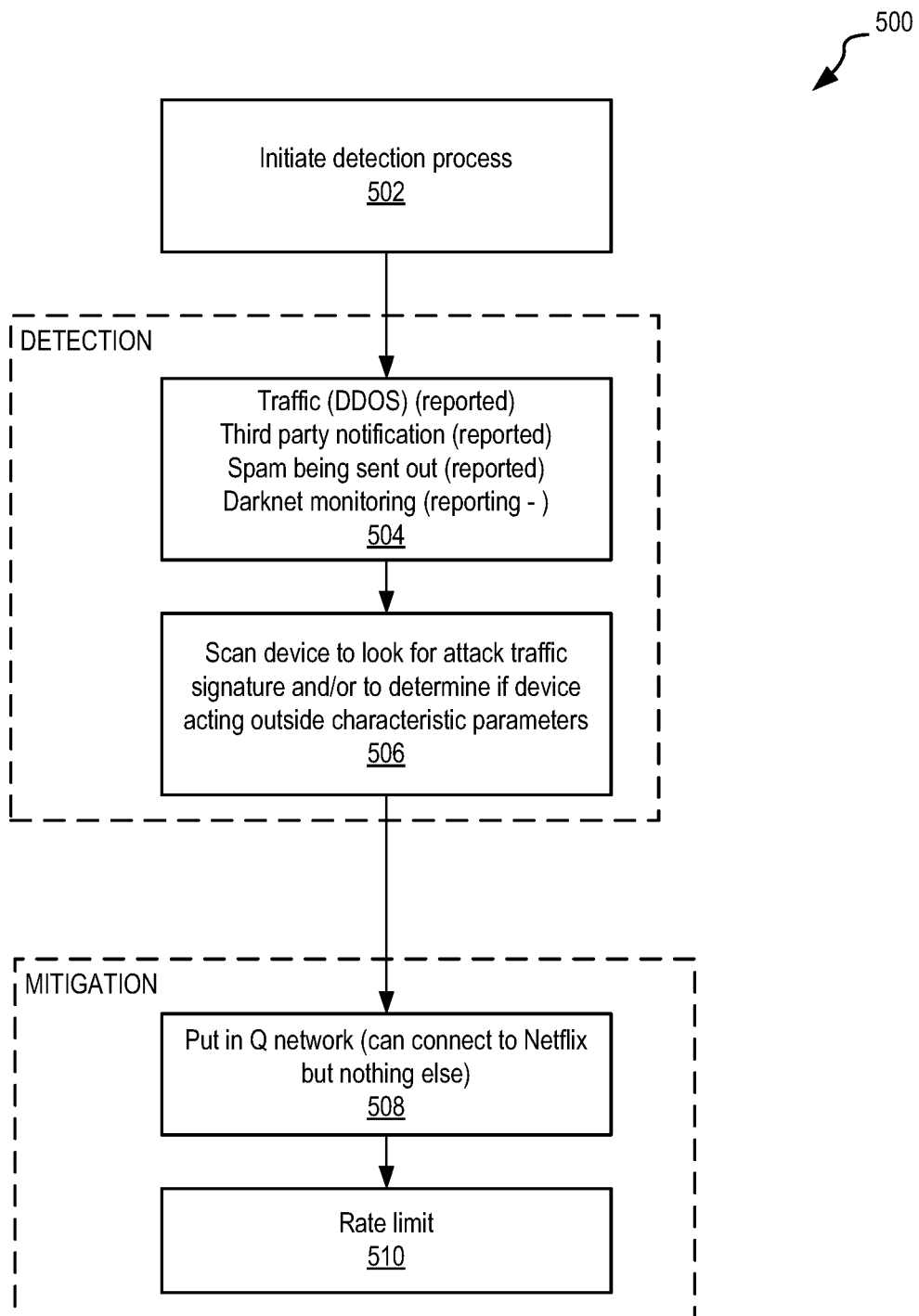
FIG. 5 shows one exemplary remediation process, in an embodiment.

FIG. 5 shows one exemplary remediation process 500, for remediating a device within the DSDN that is determined to have been infected by malicious software.

In step 502 of method 500 initiates a detection process to determine if a device is infected. One example of step 502 is router or service provider implemented DSDN system initiates a scan or monitoring of a device, subnetwork or network.

In detection step 504, method 500 utilizes third party data to determine if the device is infected. Third party data may include, but is not limited to, a report of DDOS involved computers, a report Spam involved computers, third party notifications, and computers identified during a Darknet monitoring process. One example of step 504 is a user's service provider comparing the device to one or more of the above described lists.

In detection step 506, method 500 monitors and attempts to determine if the device is infected by comparing a devices traffic and operating characteristics with a predetermined baseline device, monitoring traffic for comparison to the traffic signature of known malicious software, and/or to determine if the device is acting outside it characteristic traffic. One example of step 506 is router 106 or a service provider determining if the device is infected by comparing a device's traffic and operating characteristics with a predetermined baseline device, monitoring traffic for comparison to the traffic signature of known malicious software.

In mitigation step 508 of method 500 places the device in a limited traffic or isolation subnetwork. One example of step 508 is the router of the service provider forming and placing a smart TV with malicious software into a limited access subnetwork such that the smart TV may only access Netflix and the smart TV manufacturer.

In mitigation step 510 of method 500 rate limits the device. One example of step 510 is the DSDN capable router or service provider placing a smart light bulb into a traffic rate limited subnetwork such that a minimal amount of data can be sent from the smart light bulb.

Figure 6:
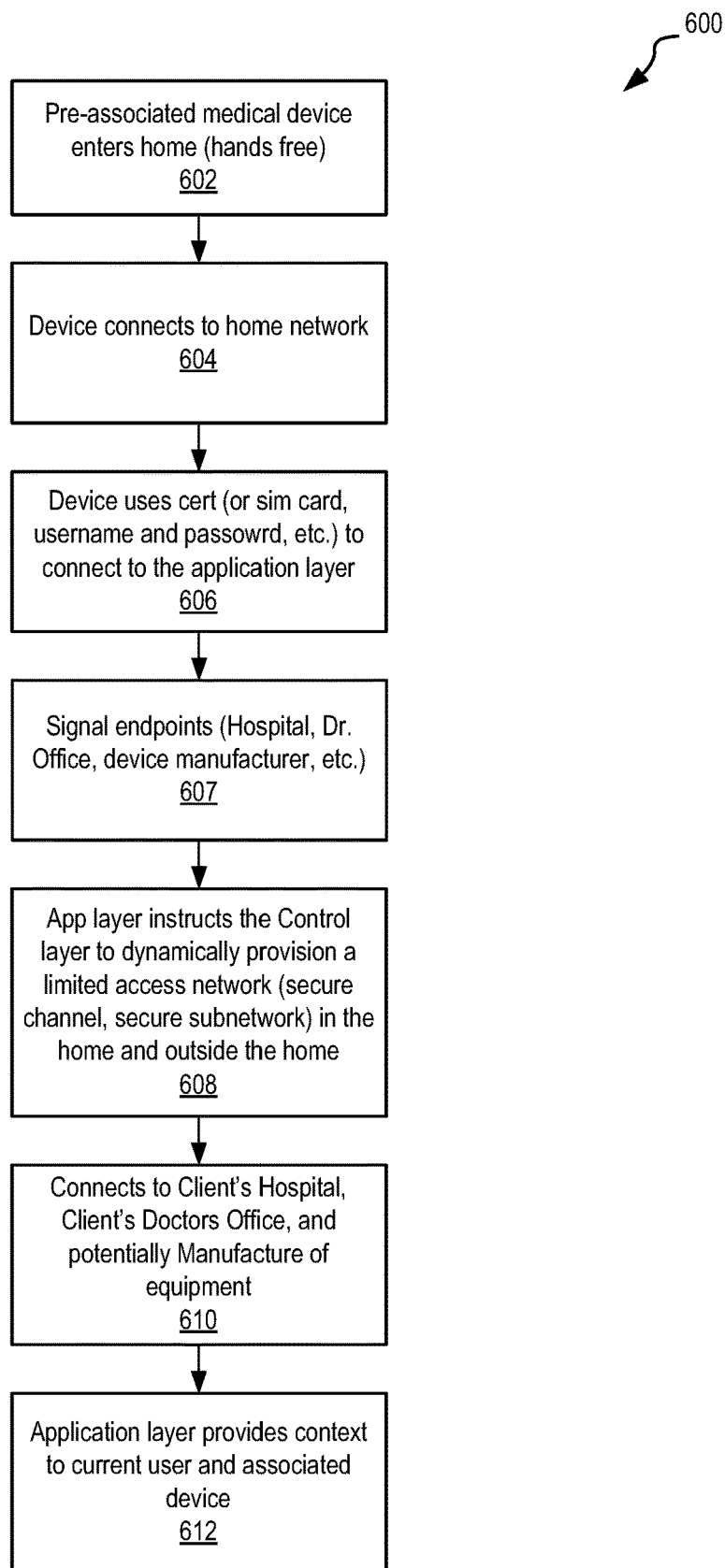
FIG. 6 shows one exemplary process for the provisioning of a headless device onto a DSDN, in an embodiment.

FIG. 6 shows a method for the provisioning of a headless device onto a DSDN. The headless device described in FIG. 6 is a medical device, such as a wirelessly capable insulin pump. It will be understood that the medical device described here is only meant to be one example of one possible headless device and not limiting in any way. Other headless devices may also be provisioned utilizing method 600 without departing from the scope herein.

In step 602 of method 600 a headless medical device enters a patient's home which is enabled with a DSDN. One example of step 602 is a patient bringing a wireless capable insulin pump into their home and powering the device on.

In step 604 of method 600 the medical device automatically connects to the DSDN. One example of step 604 is the insulin pump wirelessly connecting to the patient's DSDN.

In step 606 of method 600 the medical device utilizes a digital cert to connect to the application layer. One example of step 606 is the medical device transmitting its digital cert to router 106 of FIG. 1A or the user's service provider for processing.

In step 607 of method 600 one or more of the device, the service provider, and the medical cloud provides data regarding the endpoints for the distributed network. One example of step 607 is the router, service provider, or medical cloud identifying the patient's hospital, the patient's doctor's office, and the medical device's manufacturer as the only endpoints within the distributed network.

In step 608 of method 600 the application layer signals the control layer of the DSDN capable router to dynamically provision a limited access network or subnetwork, for example with a secure channel and/or with a secure subnetwork, in the patient's home and outside the patient's home. That is a subnetwork is formed between two remote networks such that they operate as a single network, in this example as a medical network which includes an insulin pump in a patient's home and a medical facility or monitoring service, for example at a doctor's office, that monitors and send and transmits data to the insulin pump. This medical network may also include a medical cloud service, similar to that shown in FIG. 2, and the manufacturer of the medical device. This greatly reduces the attack surface of the insulin pump and provides important information to a medical monitoring service or doctor's office.

In step 610 method 600 the insulin pump connects to the patient's doctor's office and/or the medical monitoring service, and potentially the manufacture of medical device. One example of step 610 is the insulin pump connecting to the patient's doctor's office such that the doctor may have real time information about the patient, to a medical monitoring service such that the patient may be monitored 24 hours a day, and to the manufacturer of the insulin pump such that any patches or updates may be timely provided, all over a secure network formed by the DSDN systems and method described herein.

In step 612 of method 600 the application layer provides context to the user, e.g., the patient, and any associated device. Providing context to the user may be providing information regarding the device's endpoints, traffic limitations, etc.

Micro Network Segmentation and Extension for Security and Service Enablement

The isolation network systems and methods described above thus represent particular embodiments within the larger context of the innovative micro network systems described herein, also referred to as micronetworks or micronets. The rapid growth in the number of connected devices (e.g., the IoT) has created new security risks for the networks (both wired and wireless) with which the devices seek connection. In particular network, for example, might not be put at risk to allow the device access some network services (e.g., public open Internet), but not other services (e.g., subscriber private, Enterprise secure, etc.). Accordingly, the embodiments herein describe innovative creation and management of micronets within a greater multi-level network system. The micronets establish and maintain different levels of access for a device that is connected, or is seeking connection, to the system based on the trust level for the device.

Micronet operation is thus different from conventional network access techniques that simply function as gatekeepers for allowing/disallowing devices to connect with a network. In these conventional systems, devices are either entirely allowed, or completely disallowed, access to the network based on whether can pass through the security "gate" of the network, whether virtually (e.g., password credentials) or physically (e.g., locally connected within a given server system). Some such conventional techniques are able to dynamically limit the number of devices that access the network, and restrict access to fewer devices when the network resources become overloaded, but these techniques are not known to be able to limit the level of access by a device that is already connected to the network. This all-or-nothing approach fails to address the complexities of the present rapidly-increasing world of connected devices and overlapping networks.

For example, some electronic connected devices are general purpose devices (e.g., smart phones, tablets, personal computers, etc.), which have advanced user interface capability that allows network selection and credential input (e.g., as username and password) to be made manually. Other electronic connected devices are purpose-built devices (e.g., medical devices) which may not have user interface capability for network selection or entering credentials for secure authentication. Where a connected electronic device is a purpose-built medical device, and located in a clinical setting (e.g., a hospital), the device may not be considered sufficiently trusted to access certain portions of the clinical network (e.g., secure Enterprise services, private hospital records, medical service applications), but may nevertheless need to connect with other portions of the clinical network to upload vital patient health information recorded by the device. If such a device is infected with malware, for example, it is important to prevent that devices from accessing secure portions of the network, but it is still critical that the network be able to access the vital health records recorded by the device.

The mobility of many connected devices creates additional security concerns to present networking architectures and techniques. In the case of medical devices, many such devices may be considered secure and trusted when initially provisioned in the clinical setting, but may become less secure, or even untrusted, when brought into a home network environment. Devices connected to a home network were considered significantly more vulnerable once they are connected to the Internet. Furthermore, home networking systems are becoming increasingly more complex, and many users do not, or are unable to, manage their own home network. Indeed, the typical user of a home network is not aware of what, or how many, devices are connected to the Internet through home network of the user.

Selecting which, and/or how many, devices connect to a network is rarely organized as an automated process, and the selection process is often manually intensive. Furthermore, it is particularly challenging for the typical home user to provide secure connectivity to providers of critical exterior services (e.g., healthcare, automotive, etc.). The consequence thereof, the remote services delivered by exterior service providers do not often result in a good user experience.

According to the innovative systems and methods described herein, home networks are automatically and dynamically segmented into the trust domains of micronets in order to provide automatic secure connections to services outside of the home settings. In an exemplary embodiment, individual devices may be identified using certificates, dynamic certificates, heuristics, and/or analytics, and then correspondingly put into one or more trust domains appropriate for the device use. As described above, when individual device need not be restricted to use within only one network, subnetwork, or micronet. In some embodiments, a home user is prompted for permission for a device to connect, to ensure controlled by the home user. In other embodiments, home network attachment may occur automatically, according to the trust conveyance techniques described herein, including without limitation, certificates and dynamic certificates to automatically assign home devices into trust domains.

In an exemplary embodiment, SDN and/or DSDN is implemented to establish the secure connection to services exterior to the home network. In at least one embodiment, the SDN/DSDN further utilizes a registry service. Through these advantageous systems and methods, a device may connect to various micronets within a home environment according to a level of trust associated with the device itself, and/or security levels of the exterior services with which the device may be used. The present embodiments are therefore advantageously useful with respect to conventional networks, structured Cloud-based networks, and multi-level networks (e.g., containing public-open, provider-secure, subscriber-private, etc. access levels).

Figure 7:
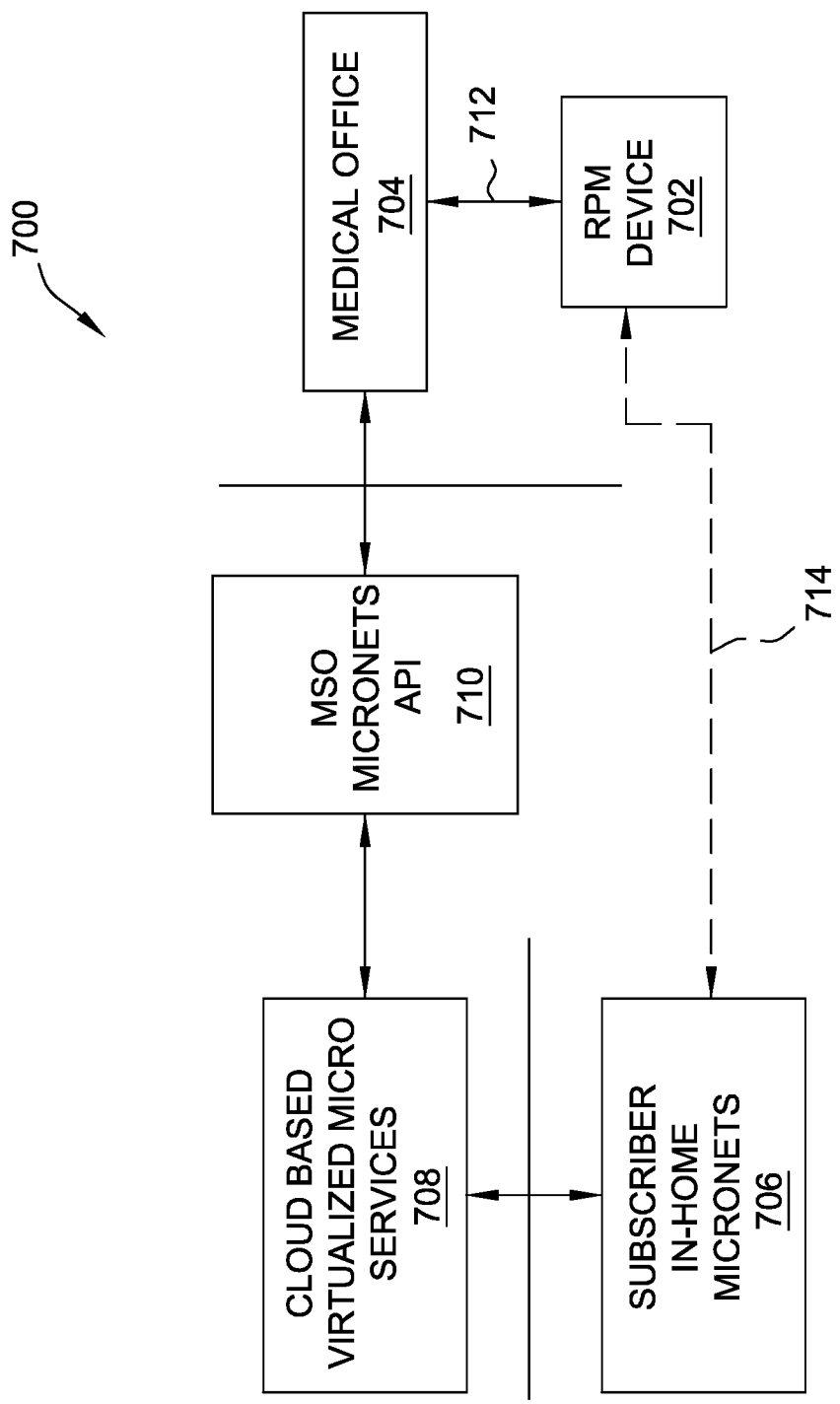
FIG. 7 is a schematic illustration of an exemplary micronetwork management system, in an embodiment.

FIG. 7 is a schematic illustration of an exemplary micronet management system 700. In an exemplary embodiment, system 700 includes an electronic device 702 configured to be capable of connecting with one of an external service provider subsystem 704 and an in-home subsystem 706. In the exemplary embodiment, in-home subsystem 704 is configured to access virtualized microservices (described further below with respect to FIG. 8) from a Cloud-based subsystem 708, which is configured to interact with external service provider subsystem 704 through a micronet application programming interface (API) subsystem 710. In the example illustrated in FIG. 7, external service provider subsystem 704 represents a medical or clinical setting, an electronic device 702 is a remote patient monitoring (RPM) device. These examples are provided though, for purposes of illustration, and are not intended to be limiting. As described above, the embodiments herein are applicable to other types of external service providers and connected electronic devices (e.g., general-purpose, purpose-built, etc).

Although not illustrated in FIG. 7, micronet API subsystem 710 may, for example, include one or more of an application server, an authentication, authorization, and accounting (AAA) server, and a Wi-Fi core unit with online signup (OSU) and an access point (AP). In some embodiments, micronet API subsystem 710 is associated with a multiple-system operators (MSO), and may represent API protocols and/or functionality for client-server or socket programming, remote procedure calls, Simple Object Access Protocol (SOAP), REpresentational State Transfer (REST), and/or other Web service APIs. Cloud-based subsystem 708 may, for example, include or connect with an electronic network, such as the Internet, a Cloud-based network, or another form of electronic network, such as a local area network (LAN) or wide area network (WAN), and in some embodiments, the Wi-Fi core unit may be configured to communicatively connect with the AAA server in the electronic network. Communicative connections from the Wi-Fi core unit may be wireless, or wired, e.g., fiber, cable, or Ethernet. Additionally, as described above with respect to the preceding embodiments, and further below with respect to FIGS. 8-9, in the exemplary embodiment, in-home subsystem 706 further includes SDN capability.

In exemplary operation of system 700, device 702 may be subject to an original provisioning operation 712 by, or at the location of, external service provider subsystem 704, and then later subject to an installation or in connection operation 714 with, or at the location of, in-home subsystem 706. Alternatively, device 702 is initially provisioned or re-purposed by/at in-home subsystem 706. In either case, system 700 enables device 702 to be assigned, using certificates/dynamic certificates through in-home subsystem 706, to a trust domain of one or more microservices provided by Cloud-based subsystem 708. By this innovative use of certificates, in-home use of device 702 may be securely assigned to the trust domain(s) automatically, without requiring any active input from the home user. Conventional device attachment techniques do not use certificates to automatically assign home devices into trust domains. Furthermore, conventional network architectures are not configured to implement SDN to dynamically organize the trust domains for home networks in particular.

Figure 8:
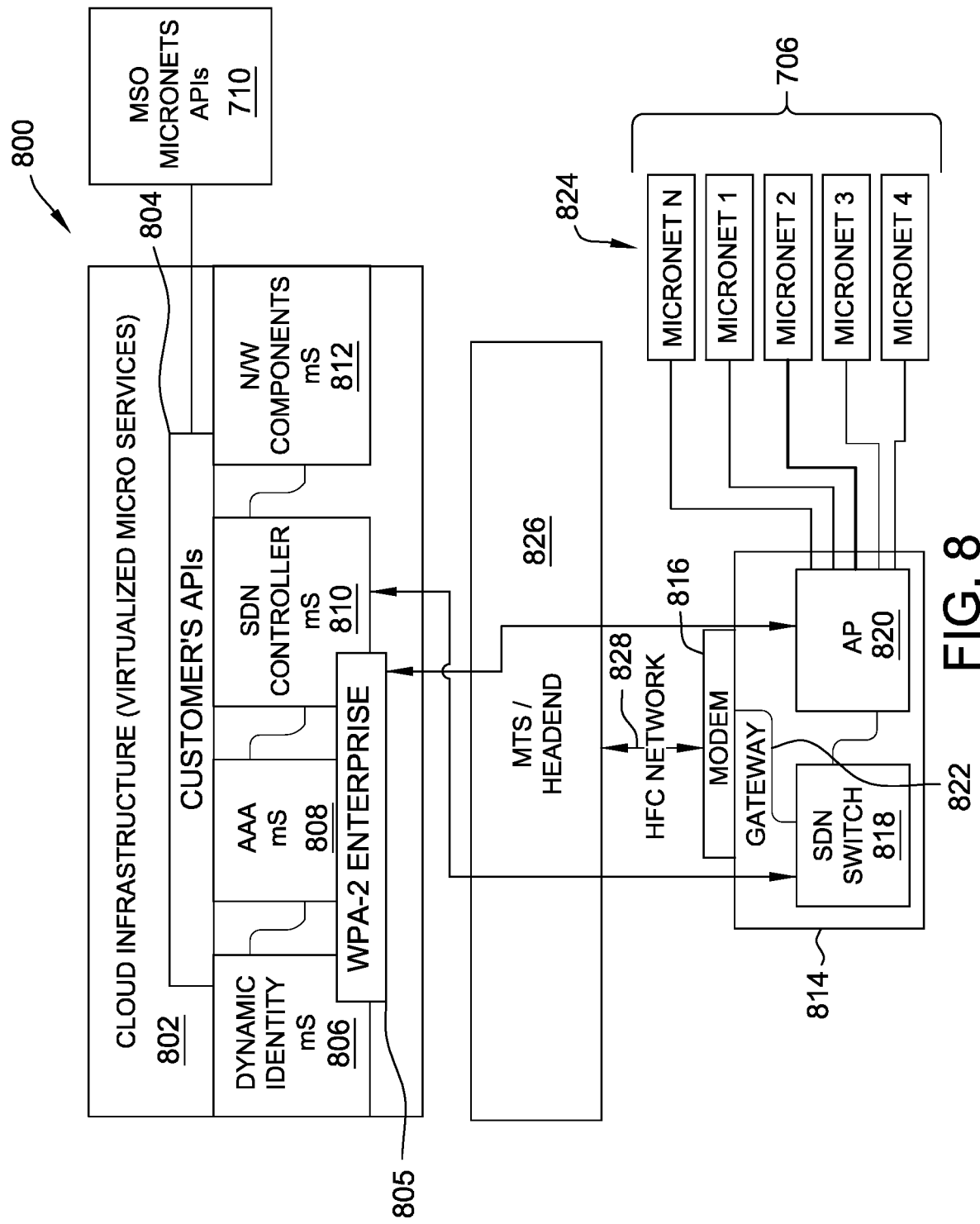
FIG. 8 is a schematic illustration of an exemplary architecture for the micronetwork management system depicted in FIG. 7.

FIG. 8 is a schematic illustration of an exemplary architecture 800 for micronetwork management system 700, FIG. 7. In an exemplary embodiment, architecture 800 includes a Cloud infrastructure 802, which enables in-home service for electronic device 702 (not shown in FIG. 8) by in-home subsystem 706. Cloud infrastructure 802 includes one or more customer APIs 804 and a server 805 configured to authenticate device 702 through in-home subsystem 706. Server 805 may, for example, be a Wi-Fi Protected Access 2 (WPA2) Enterprise server, using an IEEE 802.1X protocol, enterprise-grade authentication, and pre-shared keys (PSK) for use by in-home subsystem 706. In some embodiments, server 805 enables authentication to either a wired or wireless network, and may further implement Temporal Key Integrity Protocol (TKIP) and/or Advanced Encryption Standard (AES) encryption.

In an embodiment, customer APIs 804 are configured to interface with respective server components and/or API protocols of micronet API subsystem 710. Accordingly, in an exemplary embodiment, Cloud infrastructure 802 further includes respective modules for one or more of a dynamic identity microservice 806, an AAA microservice 808, an SDN controller microservice 810, and a network component(s) microservice 812, and in-home subsystem 706 is enabled to access one or more of these respective microservices upon authentication. In the example illustrated in FIG. 8, infrastructure 802 is shown to be Cloud-based, and microservices 806, 808, 810, 812 are shown to be virtualized. In alternative embodiments, infrastructure 802 operates according to similar functional principles, but need not be Cloud-based, and the respective microservices need not be virtualized, depending on the particular hardware versus software structure of the architecture.

In-home subsystem 706 includes a home network 814 having a modem 816, an SDN switch 818, and an AP 820. In an exemplary embodiment, SDN switch 818 enables a gateway 822 between modem 816 and AP 820, and AP 820 is configured to access one or more micronets 824 established within, or accessible by device 702 within the operation of in-home subsystem 706 (e.g., one or more isolated networks, as described above). Through the SDN switching techniques described above, gateway 822 advantageously enables home network to operably communicate with Cloud infrastructure 802 through SDN switch 818 and 820, or with a headend 826 (including, for example, a modem termination system (MTS) through modem 816 by way of a communication network 828. Communication network 828 may be a cable network, a fiber optic passive optical network (PON), or a hybrid fiber coaxial (HFC) network.

Figure 8A:
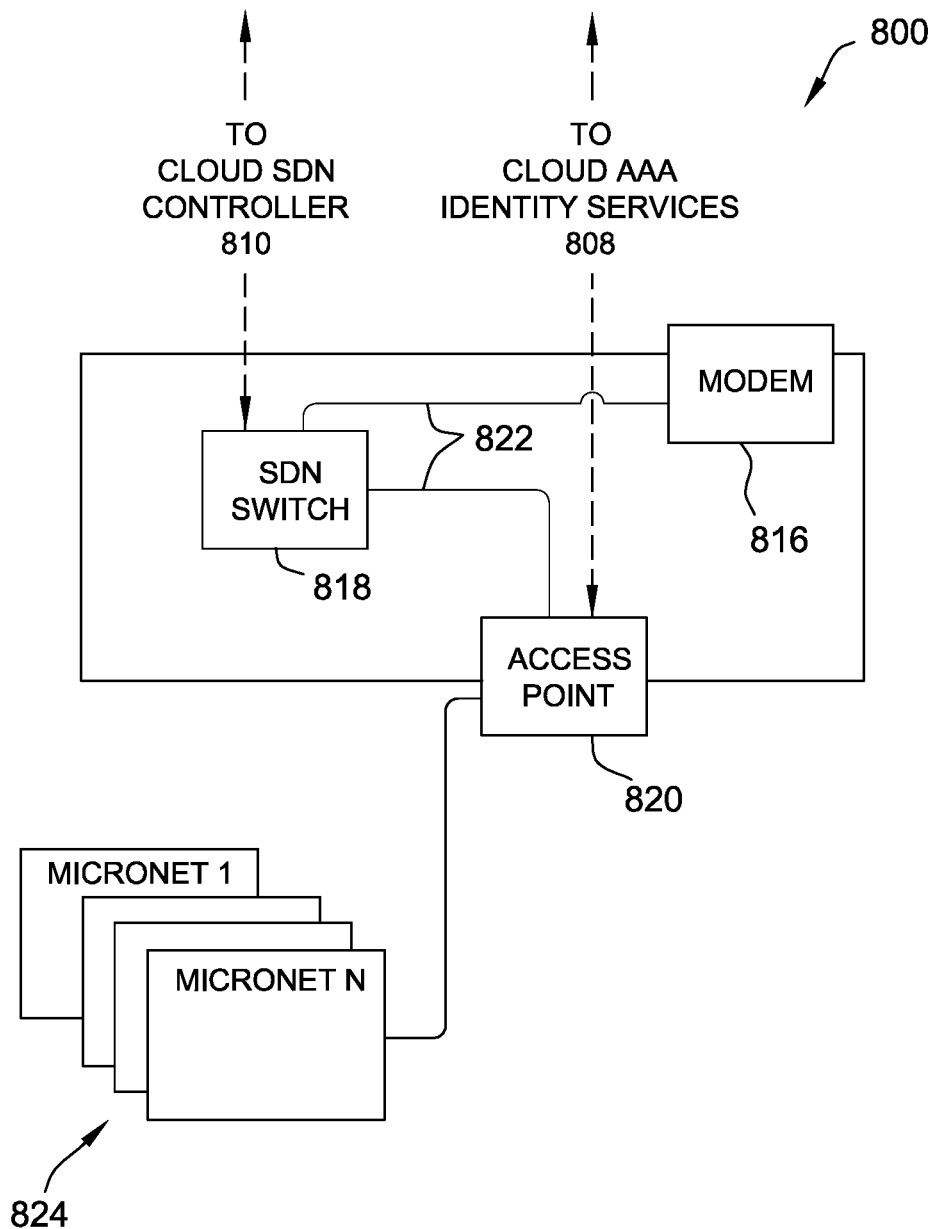
FIG. 8A is a close-up view of the home network of the architecture depicted in FIG. 8.

FIG. 8A is a close-up view of home network 814 of architecture 800, FIG. 8. FIG. 8A illustrates an exemplary embodiment in which, according to operation of SDN switch 818 and gateway 822, SDN switch 818 is enabled to operably communicate (e.g., directly) with SDN controller microservice 810 of Cloud infrastructure 802, and an AP 820 is enabled to similarly operably communicate with AAA microservice 808 (and/or dynamic identity microservice 806) of Cloud infrastructure 802.

According to the exemplary embodiments illustrated in FIGS. 8 and 8A, an innovative combination of different technologies is advantageously enabled to identify devices, such as through use of dynamic certificates, and automatically map the identified device(s) into one or more appropriate trust domains. As described herein, implementation of the trust domain utilizes SDN, which further advantageously provides the agile infrastructure (e.g., cloud infrastructure 802), which in turn secures connectivity both within and outside of home network 814. In at least one embodiment, an architecture 800 further includes an SDN controller (e.g., DSDN capable router 106, FIGS. 1A-C, step 314, FIG. 3) located in a cable network (e.g., communication network 828), within home network 814, within headend 826 (e.g., associated with a hub), or as a portion of Cloud infrastructure 802.

In some embodiments, the SDN switch is a standalone device or software module. In other embodiments, the SDN switch is an integral component of a Data over Cable Service Interface Specification (DOCSIS) device or network. In the exemplary embodiment, at least one API of micronet API subsystem 710 is configured to enable external service provider subsystem 704 to register device 702 (e.g., in processing 712) to users such that onboarding service within in-home subsystem 706 may be automated, and also automatically establish secure connectivity to external service provider subsystem 704. As described above, conventional techniques for managing trust within home networks typically require, for electronic devices utilizing an API, the device users to actively placed the device into the trust domain. According to the innovative systems and methods described herein though, user activity is greatly reduced or eliminated, through a novel use of certificates and dynamic certificates that automatically assign the home device into the respective trust domain, and particularly through use of SDN to organize the trust domains dynamically.

In at least some embodiments the certificates/dynamic certificates described above may include secure credentials, such as, X.509 certificates, which may be used for device authentication for both general purpose devices (e.g., smart phones, tablets, personal computers, etc.) and purpose-built devices (e.g., medical devices) which may not have user interface capability for making manual network selection and for manually entering credentials (such as username and password) for secure authentication.

A detailed description of schemes for automated network discovery and attachment of an external provider network by an electronic device are described in greater detail in co-pending U.S. patent application Ser. No. 15/419,853 filed Jan. 30, 2017, the disclosure of which is incorporated herein by reference in its entirety. However, where this previous application described novel two-stage authentication techniques for a multi-level network, the present embodiments feature innovative techniques for segregating the connected device into one or more micronets, we are each micronet may have own level of security access. Whereas this previous application describes device discovery of and attachment to existing multi-level external provider networks, the present embodiments describe the creation multiple micronets within a single home network environment. In this respect, the present systems and methods are fully compatible and complementary with this previous application.

In some embodiments, electronic device 702 includes an integral Wi-Fi module (not shown) having an embedded Wi-Fi chip, or alternatively, a separate and/or removable Wi-Fi module having a standard interface (e.g., USB, Ethernet, compact flash, etc.). In at least one embodiment, in the case where device 702 is a medical device, both an X.509 certificate, and additionally a medical device functionality certificate conforming to C4MI requirements for interoperability, may be used for authenticating device 702 either at external provider subsystem 704, or at in-home subsystem 706. The embodiments described above may also utilize Wi-Fi certificates (e.g., provisioned at manufacture of device 702, or by external provider subsystem 704) such as those compatible with Hotspot 2.0 or Passpoint implementations. Credential sets that may be compatible some or all of the embodiments described herein include, without limitation, device or user certificates such as Extensible Authentication Protocol (EAP), EAP Transport Layer Security (EAP-TLS), EAP-TTLS Password Authentication Protocol (PAP), Subscriber Identity Module (SIM) based credentials for mobile operators, such as EAP Subscriber Identity Module (EAP-SIM), EAP Authentication and Key Agreement (EAP-AKA), and EAP Authentication and Key Agreement prime (EAP-AKA').

At least some of the certificates described herein may be obtained from a Certificate Authority (CA) before device 702 may be certified to the trust domain of the respective micronet. Alternatively, a certificate may be pre-installed on device 702 at the time of manufacture (or provisioned by external service provider 704), and authentication of device 702 in use at in-home subsystem 706 includes a step of verifying the pre-installed certificate with the CA. Utilization of credential sets from a CA may advantageously further enable the system to mitigate "man-in-the-middle" attacks and malicious APs. CA utilization ensures that the device does not allow a user to bypass network authentication, or to accept an unknown CA certificate if compliant with the specifications of the trust domain. In some cases, certificates may also be authenticated using such protocols as Protocol for Carrying Authentication for Network Access (PANA), Hypertext Transfer Protocol (HTTP) over TLS (HTTPS), or Internet Protocol Security (IPsec), etc.

In some embodiments, the involvement of home deployment 4 purpose-built devices, when implemented according to an 802.11 specification, standard 802.11 MAC signaling protocols might support only one security paradigm per SSID. Accordingly, multiple SSIDs may be implemented to allow a combination different security paradigms. In other embodiments, reserved vendor proprietary fields are utilized to construct an equivalent scheme, which is then either standardized, or involves vendor proprietary procedures at the device and AP.

Figure 9:
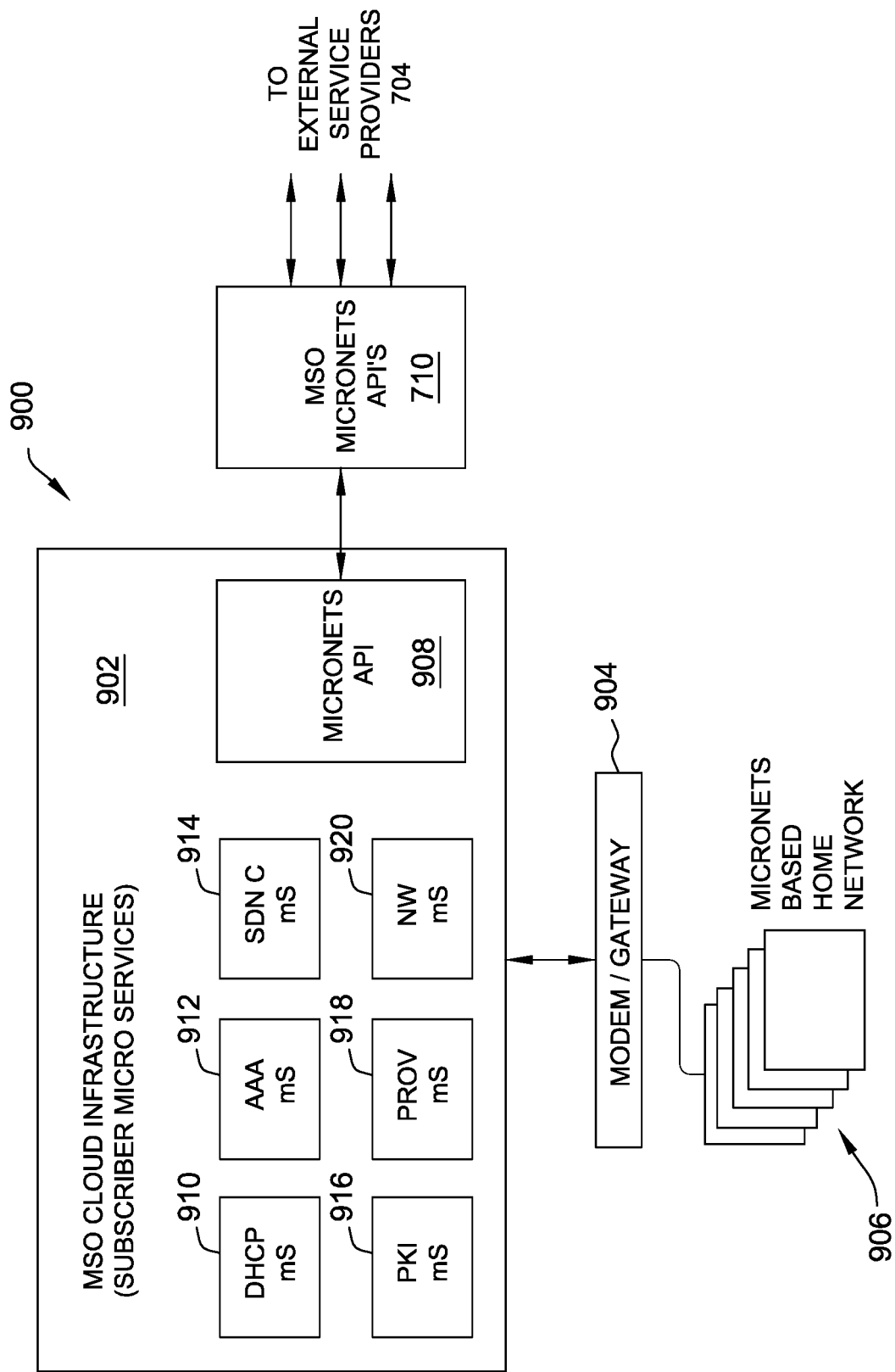
FIG. 9 is a schematic illustration of an alternative architecture for the micronetwork management system depicted in FIG. 7.

FIG. 9 is a schematic illustration of an alternative architecture 900 for micronetwork management system 700, FIG. 7. Architecture 900 is similar to architecture 800, FIG. 8, and may be implemented with respect to device 702, FIG. 7, except that architecture 900 is illustrated for a subscriber-based microservice paradigm, which need not include a separate communication network. Authentication and trust domain assignment of the device within architecture 900 may otherwise function similarly to equivalent operations within architecture 800.

In an exemplary embodiment, architecture 900 includes a Cloud infrastructure 902, which enables in-home service for electronic device 702 (not shown in FIG. 9), through a modem/gateway 904, by a micronets-based home network 906. Home network 906 may be, for example, similar in structure and function to in-home subsystem 706, FIG. 7. Cloud infrastructure 902 includes one or more micronet APIs 908 configured to interface with respective server components and/or API protocols of micronet API subsystem 710. Accordingly, in an exemplary embodiment, Cloud infrastructure 802 further includes respective modules for one or more of a Dynamic Host Configuration Protocol (DHCP) microservice 910, an AAA microservice 912, an SDN controller microservice 914, a public key infrastructure (PKI) microservice 916, a provider microservice 918, and a network component(s) microservice 920. Similar to the embodiments described above, home network 906 is enabled to access one or more of these respective microservices upon authentication of device 702. This exemplary architecture is particularly useful in the case where a home network may be a private network, is not connected to the Internet, or is isolated or separate in at least some respects from the Internet or other electronic networks (e.g., cable or satellite service to a home).

Micronetworks Modeling, Data Structures, and SDN Controller

Further to the micronetworks embodiments described above, additional embodiments are described herein for organizing networks into micronetworks, as well as systems and methods for controlling the segmentation and operation thereof. More particularly, the following embodiments describe flow table structures for organizing a network into segmented trust domains in SDN controlled switches (bridges), and also logical architectures and implementations of associated SDN controllers.

For illustrative purposes, and not in a limiting sense, the following controller embodiments are described in the context of the OpenDayLight (ODL) modular platform for SDN and network functions virtualization (NFV). The person of ordinary skill in the art though, will understand that the techniques and structures herein are applicable to other open source platforms and/or different proprietary controllers. The following examples are additionally described in the context of the OpenFlow communications protocol, however, the person of ordinary skill in the art will further understand that other protocols (e.g., P4, Netconf, or similar) may also be used without departing from the scope herein.

In an exemplary embodiment, an SDN-controlled switch is configured to dynamically implement flow tables (such as those implemented by an Open vSwitch (OVS) bridge) to establish micronetworks, or micronets/Micronets. SDN controllers manage OVS bridges and control the routing of devices connected to the bridges by writing flows (e.g., OpenFlow, Netconf, P4, etc.) to the bridges. In the following embodiments, a Micronets controller application is illustrated as being controlled Northbound by a Micronets manager. In some embodiments, flows may be defined using IP layer information, such as destination and ordination IP addresses, as well as packet type. In other embodiments, flow tables may be established using packet or frame layer information, including payload level data. In at least one embodiment, external service logic may be further implemented to analyze complex data, and thus define flow table entries according to the needs of supported services.

For the purposes of the following description, a "Micronet" may refer to an IP subnetwork, or subnet, to which devices are assigned. The assigned devices may be identified by a variety of processes (e.g., MAC address, PKI certificate, IP addresses, etc.). In an exemplary embodiment, when a new device is connected to an OVS bridge, a Micronets ODL application is configured to detect the OVS port up notification, and then send a notification Northbound to the Micronets manager. The Micronets manager may then in-turn configure a DHCP server to offer IPs for the relevant Micronet subnet. In some instances. the Micronets manager may further configure the Micronets ODL application with pertinent information about the newly connected device(s), such that the new device may be placed within the corresponding Micronet, at which time any needed or desired OpenFlow flows may be written.

In an embodiment, a Micronets model is written for the Micronets ODL application according to a data modeling language (e.g., described further herein with respect to a YANG data modeling language model). This model is configured to enable the Micronets ODL application to manage devices, and also to allow for configuration from the Micronets Manager. In some embodiments, this configuration is received from the Micronets Manager, and may include Micronets create, read, update, and delete (CRUD) messages, as well as capabilities for moving a device from one Micronet to another (described below in relation to a Micronet device "delete" and/or "add"), and also for configuring inter-Micronet routing that has been allowed.

In an exemplary embodiment, a Micronets OpenDaylight data model defines elements necessary for the management of the Micronets, as well as the devices connected to each Micronet. The OpenDaylight data model may utilize different data models, however, for ease of explanation, three exemplary data models are described below: (1) a Micronets OpenDaylight YANG model; (2) a Micronets Northbound Notification data model; and (3) a Micronet device filtering data model. In an exemplary embodiment, the OpenDaylight includes an OpenDaylight Model-driven Service Abstraction Layer (MD-SAL) data store (described further below with respect to FIG. 12). In this example, the MD-SAL data store has a tree-like logical structure, and includes at least two sub-stores: (i) a Configuration data sub-store; and (ii) an Operational data sub-store. In this example, the Configuration data sub-store maintains the configuration intent, while the Operational data sub-store maintains the system state. Therefore, the exemplary Micronets data model embodiments herein are described to maintain Micronet data as received by way of RESTCONF Northbound in the Configuration data sub-store, and to store information about the devices connected to Micronets in the Operational data sub-store.

In an exemplary embodiment, the Micronets OpenDaylight YANG model may be defined according to a Yang data modeling language of computer code or executable instructions. Exemplary coding schemes for configuration data in the Micronets Configuration Data sub-store and for operational data in the Micronets Operational Data sub-store are also provided. It may be noted that operational data includes additional fields that may not be not present in configuration data.

In an exemplary embodiment, the Micronets Northbound Notification data model is configured for Northbound Asynchronous notifications originating in ODL, and sent to the Micronets Manager. These notifications may be used to notify the Micronets Manager of particular occurrences or events, including without limitation: (i) an ODL start; (ii) an OVS manager connected to or disconnected from ODL; (iii) an OVS bridge created or deleted; (iv) an OVS bridge port up; (v) an unknown device; (vi) an unknown device MAC; (vii) an unknown device Subnet IP; (viii) packets received on unknown bridge port; (ix) forbidden device inter-micronet-routing; and/or (x) forbidden device internet-routing.

In an exemplary embodiment, the Micronet device filtering data model is configured to enable the Micronets Manager to determine whether a device packet should be dropped or passed. For example, packets may occasionally be received from unknown devices. In such circumstances, the OVS bridge may be programmed to send a PacketIn to the Micronets ODL Application, which thereby results in the occurrence of a related PacketIn event that may be translated to an Unknown Device Notification (e.g., according to the Micronets Northbound Notification data model, described above), which then may be written to the data store. Upon receipt of this event, the Micronets Manager may then instruct the Micronets ODL Application to either drop subsequent device packets or to let them pass. That is, the Micronets Manager is configured to instruct the Micronets ODL Application via the Micronet device filtering data model.

Figure 10:
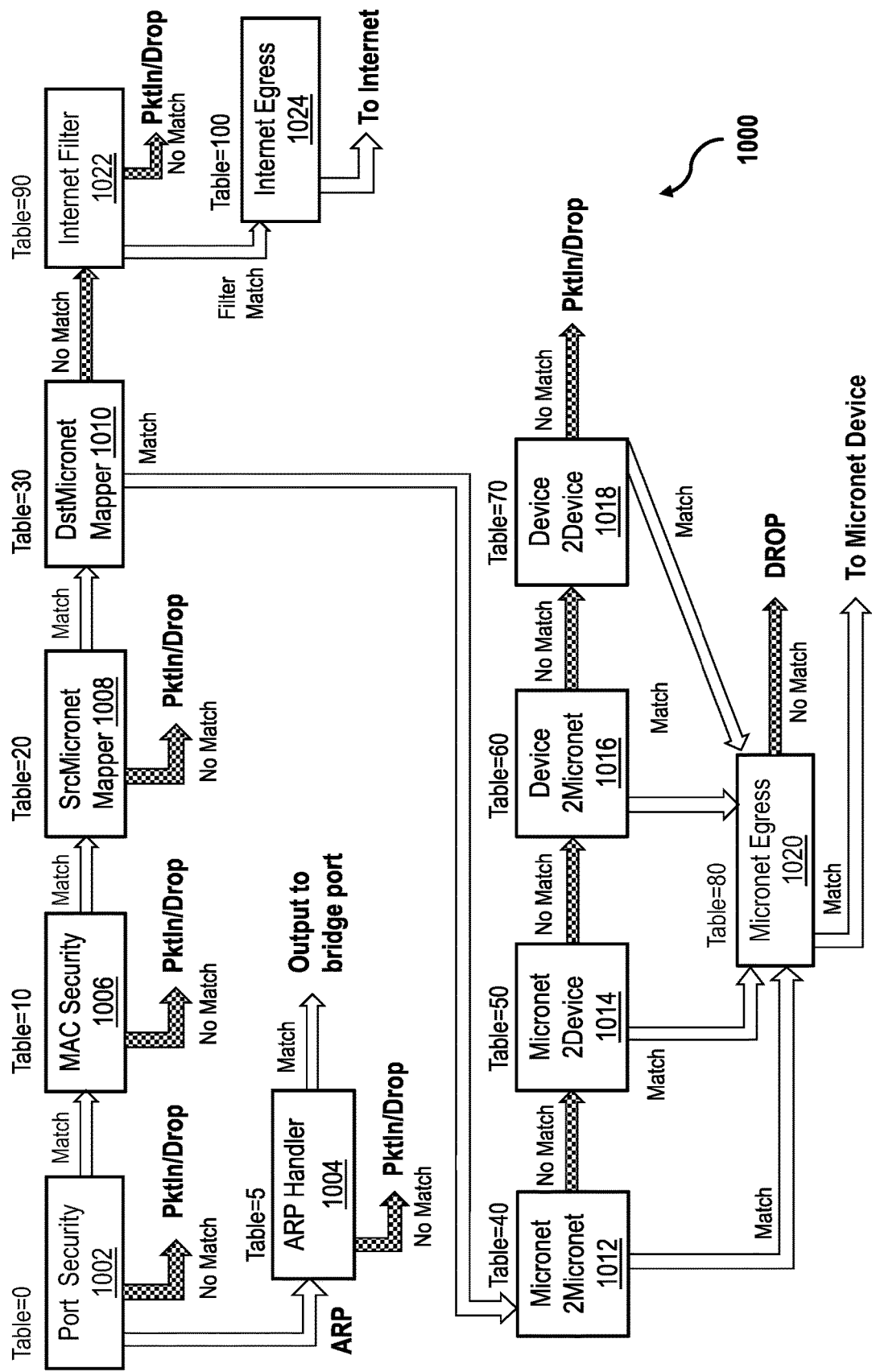
FIG. 10 is a schematic illustration of an exemplary micronets flow table architecture, in an embodiment.

FIG. 10 is a schematic illustration of an exemplary micronets flow table architecture 1000. In an embodiment, architecture 1000 represents a Micronets ODL OpenFlow pipeline flow table structure, including the introduction of flows for a Micronet Mapper (described further below), as well as subsequent tables for individual micronets. In the example illustrated in FIG. 10, only four micronets are depicted for ease of explanation, and not in a limiting sense. The person of ordinary skill in the art will understand that greater or fewer micronets may be supported by the present systems and methods.

In an exemplary embodiment, the logical structure of architecture 1000 includes a port security table 1002 (Table 0), an address resolution protocol (ARP) handler table 1004 (Table 5), an MAC security table 1006 (Table 10), a source Micronet Mapper table 1008 (Table 20), a destination Micronet Mapper table 1010 (Table 30), a Micronet-to-Micronet routing security table 1012 (Table 40), a Micronet-to-device routing security table 1014 (Table 50), a device-to-Micronet routing security table 1016 (Table 60), a device-to-device routing security table 1018 (Table 70), a Micronet egress table 1020 (Table 80), an Internet filter table 1022 (Table 90), and an Internet egress table 1024 (Table 100).

In the exemplary embodiment, port security table 1002 is configured to allows only packets from expected OVS bridge ports (e.g., all device ports, DHCP pass-through port, internet ingress port), and also allow DHCP requests to pass-through. In the case of a match on a port or protocol, port security table 1002 may be further configured for execution of the following actions: (i) for a match on an OVS bridge in-port, an action goto MAC security table 1006; (ii) for a match on an Internet ingress port, an action push a virtual local area network (VLAN) goto MAC security table 1006; (iii) for a match on an ARP protocol, an action goto ARP handler table 1004; and (iv) for a match on a DHCP protocol (e.g., UDP port 67), an action output to a DHCP pass-through port or device depending on DHCP ingress or egress. In the case where there is no match, port security table 1002 may be configured to send packets received on unknown ports to ODL and then drop the packets, also referred to herein as Packet-In-and-Drop (PktIn/Drop).

In a similar manner, ARP handler table 1004 is configured to handle all ARP packets on the bridge. For each device, ARP handler table 1004 may be further configured to: (i) upon a match on ARP requests (e.g., arp_op=1) and ARP Target Protocol Address (TPA)=device IP, an action output to the device bridge port (i.e., this flow may handle ARP requests sent to devices, such as in the case of device-to-device communication, and output ARP packets to the respective device bridge port); and (ii) upon a match on ARP responses (e.g., arp_op=2) and MAC destination=device MAC, an action output to respective device bridge port (i.e., this flow may handle ARP responses sent back to devices). In the case of other ARP requests (e.g., arp_op=1), an action output to a LOCAL port (i.e., this flow may send out all other ARP requests). In the case where there is no match, ARP handler table 1004 may be configured to drop the packets.

In an exemplary embodiment, the flow of MAC security table 1006 may be configured to only allow packets with expected MAC addresses and, for packets that do not match, a Packet-In notification may be sent, and the Micronets Manager may then send a message to either allow or block these packets (i.e., and reflected in MAC security table 1006). In the case of a match on source (Src)-MAC, the flow from table 1006 may further an action goto source Micronet Mapper table 1008. In the case of no match, packets received with MACs unknown to ODL may be dropped.

In an exemplary embodiment, the flow of source Micronet Mapper table 1008 may be configured to a simple IP Access Control List (ACL) to map packets to the Micronet. This flow is of particular use in the determination of inter-micronet routing. In the case of a packet that does not match, and a Packet-In is sent, the Micronets Manager may send a message to either allow or block the non-matching packets, and the status thereof may then then be reflected in table 1008. Accordingly, for a match on a Src IP subnet, this flow may result in an action store MicronetId in reg0, and an action goto destination Micronet Mapper table 1010. In the case of no match, packets that are received with IP Subnets unknown to ODL may be dropped.

In an exemplary embodiment, the flow of destination Micronet Mapper table 1010 may also be configured according to a simple IP ACL to determine if the packets in question should go to another Micronet on that particular bridge. This flow is also useful in the determination of inter-micronet routing. In the case of a match on a destination (Dst) IP subnet, this flow may result in an action Set DstVlanID, an action store Dest MicronetId in reg1, and an action goto Micronet-to-Micronet routing security table 1012. In the case of no match, with Internet traffic, and no inter-micronet routing necessary, this flow may result in an action goto Internet filter table 1022.

In an exemplary embodiment, the flow of device-to-Micronet routing security table 1016 is configured such that a particular device on this Micronet is enabled to communicate with all devices on the destination Micronet. In an embodiment, this flow may be based on both the source and the destination Micronets, and also on the source MAC. This flow may also be advantageously used to determine if the packets are allowed to be routed to the intended destination. In the case of a match on an Src MicronetId (reg0), a Dst MicronetId (reg1), and a Src MAC, this flow may result in an action goto Micronet egress table 1020. Alternatively, in the case of no match, this flow may instead result in an action goto device-to-device routing security table 1014.

In an exemplary embodiment, the flow of Micronet-to-device routing security table 1014 is configured such that all devices on this Micronet are enabled to communicate with a particular device on the destination Micronet. In an embodiment, this flow may be based on both the source and the destination Micronets, and also on the destination MAC. This flow may also be advantageously used to determine if the packets are allowed to be routed to the intended destination. In the case of a match on a Src MicronetId (reg0), a Dst MicronetId (reg1), and a Dst MAC, this flow may result in an action goto Micronet egress table 1020. Alternatively, in the case of no match, this flow may instead result in an action goto device-to-Micronet routing security table 1016.

In an exemplary embodiment, the flow of device-to-Micronet routing security table 1016 is configured such that a particular device on this Micronet is enabled to communicate with all devices on the destination Micronet. In an embodiment, this flow may be based on both the source and the destination Micronets, and also on the source MAC. This flow may also be advantageously used to determine if the packets are allowed to be routed to the intended destination. In the case of a match on an Src MicronetId (reg0), a Dst MicronetId (reg1), and a Src MAC, this flow may result in an action goto Micronet egress table 1020. Alternatively, in the case of no match, this flow may instead result in an action goto device-to-device routing security table 1018.

In an exemplary embodiment, the flow of device-to-device routing security table 1018 is configured such that a particular device on this Micronet is enabled to communicate with a particular device on the destination Micronet. In an embodiment, this flow may be based on both the source and the destination MAC. This flow may represent a further security level to advantageously determine if some packet routing is allowed to the intended destination, even where the source and destination Micronets do not themselves allow such routing with one another as a whole, or with particular devices in one of the Micronets. Accordingly, in the case of a match on a Src MAC and a Dst MAC, this flow may result in an action goto Micronet egress table 1020. Alternatively, in the case of no match, this flow will instead result in a PktIn/Drop, since there was not a match in any of the inter-micronet routing tables 1012, 1014, 1016, 1018.

In an exemplary embodiment, the flow of Micronet egress table 1020 is configured such that, upon a match in one of the inter-micronet routing tables 1012, 1014, 1016, 1018, this flow may be used to determine if the packets may be output to the port that the destination device is on. Accordingly, the case of a match on a Dst MAC, this flow may output to the OVS bridge port of the device. Alternatively, in the case of no match, the packets are dropped.

In an exemplary embodiment, the flow of Internet filter table 1022 is configured to control which devices are enabled to navigate to the Internet, and in some embodiments, how the navigation is performed. In an embodiment, in the case where no filters are configured for a device, this flow may result in a default status that the device enabled to freely navigate to the Internet. In other embodiments, for each device having an Internet filter, this flow may create a filter, and for a match on device SrcIp and available 5-tuple fields, result in an action goto Internet egress table 1024. Alternatively, for a device having an Internet filter but no match for the device SrcIp 5-tuple, this flow may instead result in a PktIn/Drop action.

In an exemplary embodiment, the flow of Internet egress table 1024 may be configured to (i) strip the VLAN (if present), and (ii) output the packet(s) to the relevant Internet OVS bridge port. The visualization of architecture 1000 of the Micronets OpenFlow pipeline illustrated in FIG. 10 is described further below with respect to the following examples. These examples are provided by way of illustration, and not in a limiting sense.

In an exemplary embodiment, a primary role of port security table 1002 is to only allow packets to enter the bridge on expected bridge ports. Since table 1002 is the first table encountered by all packets entering the bridge, the innovative logical structure of architecture 1000 may be further configured to advantageously implement a number of additional flows, or sub-flows, within port security table 1002, such that basic Micronets communication may be more easily and more efficiently controlled. In the following examples, the several flows are described in a particular order of flow priority, but the person of ordinary skill in the art will understand that some flows may occur in a different order without departing from the scope herein.

In an exemplary embodiment, the first two port security sub-flows are referred to herein as "DHCP pass-through flows." The DHCP pass-through flows may, for example, be expressed as follows:
  cookie=0xba5eba11, table=0, priority=195,udp,tp_src=67
    actions=goto_table:80
  cookie=0xba5eba11, table=0, priority=195,udp, tp_dst=67 actions=LOCAL According to these DHCP pass-through flows, packets originating from a DHCP server will match "udp, tcp_src=67", whereas packets sent to a DHCP server will match "udp,tcp_dst=67". In this example, the Micronet configuration value "dhcp-server-port" may be used to output packets that are destined to the DHCP server. All ARP packets may then be processed by ARP handler table 1004 according to the following sub-flow:
  cookie=0xba5eba11, table=0, priority=195,arp
    actions=goto_table:5

In an embodiment, additional port security sub-flows are referred to herein as "Port Security Trunk Micronet flows." The Port Security Trunk Micronet flows are configured to ensure that only those packets coming from the "trunk-gateway-ip" (nw_src), and destined for a "micronet-subnet" (nw_dst), are allowed from the bridge LOCAL port. The Port Security Trunk Micronet flows may be expressed as follows:
  cookie=0xba5eba11, table=0,
    priority=120,ip,in_port=LOCAL,nw_src=10.36.32.55, nw_dst=192.168.250.0/24
    actions=goto_table:20
  cookie=0xba5eba11, table=0,
    priority=120,ip,in_port=LOCAL,nw_src=10.36.32.55, nw_dst=192.168.251.0/24
    actions=goto_table:20
  cookie=0xba5eba11, table=0,
    priority=120,ip,in_port=LOCAL,nw_src=10.36.32.55, nw_dst=192.168.252.0/24
    actions=goto_table:20

In an embodiment, further port security sub-flows are referred to herein as "Port Security Trunk Loopback flows." The Port Security Trunk Loopback flows are configured such that any other packets that ingress from the LOCAL port from the "trunk-gateway-ip" (nw_src) will be egressed to the "trunk-gateway-port". Conversely, the Port Security Trunk Loopback flows are additionally configured such that any other packets that ingress from the "trunk-gateway-port" from the "trunk-gateway-ip" (nw_src) will be egressed to the LOCAL port. The Port Security Trunk Loopback flows may be expressed as follows:
  cookie=0xba5eba11, table=0, priority=110,ip, in_port=LOCAL,nw_src=10.36.32.55
    actions=output:1
  cookie=0xba5eba11, table=0, priority=110,ip,in_port=1, nw_dst=10.36.32.55 actions=LOCAL The following port security sub-flows may be configured to control ingress packets for all created Micronets devices and, in an exemplary embodiment, one of these flows is provided for each Micronet device:
  cookie=0xba5eba11, table=0, priority=100,in_port=4
    actions=goto_table:10
  cookie=0xba5eba11, table=0, priority=100,in_port=3
    actions=goto_table:10
  cookie=0xba5eba11, table=0, priority=100,in_port=2
    actions=goto_table:10

It may be noted, that for these sub-flows, the "in_port" field is taken from the "device-openflow-port" field from the "connected-devices" Micronets container.

In an embodiment, still further port security sub-flows, referred to herein as "Trunk Port Ingress flows," may be provided to allow packets to ingress from the bridge trunk port. Accordingly, in the case where a VLAN is not configured, a Trunk Port Ingress flow may be created according to:
  cookie=0xba5eba11, table=0, priority=100,in_port=1
    actions=goto_table:20

Alternatively, in the case where a VLAN is configured, a Trunk Port Ingress may instead be created as follows:
  cookie=0xba5eba11, table=0, priority=100,in_port=1
    actions=push_vlan:0x8100,goto_table:20

In this exemplary embodiment, any other packets from the bridge LOCAL port may then be handled by a port security sub-flow referred to herein as a "Port Security Local flow," which may be expressed according to:
  cookie=0xba5eba11, table=0,
    priority=100,in_port=LOCAL
    actions=load:0→NXM_NX_REG0[ ],goto_table:30

In this example, may be noted that the Source Micronet is set to the default source micronet (0), and that these packets are sent on to destination Micronet Mapper table 1010 for continued processing. Any remaining packets may then be sent to the controller as a PacketIn according to the following flow:
  cookie=0xba5eba11, table=0, priority=5
    actions=CONTROLLER:40

The final port security sub-flow described herein is referred to as a "Port Security Quench flow." Packets that are received on unknown bridge ports are sent to the controller as a PacketIn, and the controller may then create a Port Security Quench flow to drop all subsequent packets of the same type. An exemplary Port Security Quench flow may be represented according to:

cookie=0xf005ba11, table=0, idle_timeout=120, priority=150,in_port=5 actions=drop In this example, it may be noted that the Port Security Quench flows may all have the cookie set to "foosball" (i.e., f005ba11), for easy identification. Additionally, each cookie may further include an inactivity timeout, such that they will be automatically deleted when they timeout.

In an exemplary embodiment, ARP handler table 1004 is configured to handle all ARP packets on the bridge. In an embodiment, an ARP handler sub-flow for handling ARP requests (arp_op=1) sent to the Micronet devices may be expressed according to:

cookie=0xba5eba11, table=5, priority=110,arp, arp_tpa=192.168.250.2,arp_op=1 actions=output:2
cookie=0xba5eba11, table=5, priority=110,arp, arp_tpa=192.168.252.3,arp_op=1 actions=output:4
cookie=0xba5eba11, table=5, priority=110,arp, arp_tpa=192.168.251.2,arp_op=1 actions=output:3

The ARP requests, for example, may typically be sent for device-to-device communication, and there may be one of these flows for each Micronet device. In this example, the ARP TPA is shown in the "device-ip" field, and the output is shown in the "device-openflow-port" field, with both fields from the "connected-devices" Micronets container. The handling of ARP responses (arp_op=2) that are sent back to the devices, on the other hand, may be represented according the following exemplary ARP handler sub-flows:

cookie=0xba5eba11, table=5, priority=100,arp, dl_dst=b8:27:eb:ab:41:12,arp_op=2 actions=output:4
cookie=0xba5eba11, table=5, priority=100,arp, dl_dst=b8:27:eb:19:11:87,arp_op=2 actions=output:4
cookie=0xba5eba11, table=5, priority=100,arp, dl_dst=b8:27:eb:df:ae:a7,arp_op=2 actions=output:3
cookie=0xba5eba11, table=5, priority=100,arp, dl_dst=b8:27:eb:8d:30:27,arp_op=2 actions=output:2

In this example, the source mac (dl_dst) is the "device-mac", and the output is the "device-openflow-port" field, and both are taken from the "connected-devices" Micronets container. These ARP handler sub-flows may be created, for example, in the case where no VLAN is configured. However, in the case where a VLAN is configured (i.e, and the VLAN tag is set from the Micronet configuration), exemplary ARP handler sub-flows may be created according the following flow examples:

cookie=0xba5eba11, table=5,
    priority=100,arp,vlan_tci=0x1000/0x1000,dl_dst=b8:27:eb:ab:41:12,arp_op=2
    actions=push_vlan:0x8100,set_field:4196→vlan_vid, output:4
cookie=0xba5eba11, table=5,
    priority=100,arp,vlan_tci=0x1000/0x1000,dl_dst=b8:27:eb:19:11:87,arp_op=2
    actions=push_vlan:0x8100,set_field:4196→vlan_vid, output:4
cookie=0xba5eba11, table=5,
    priority=100,arp,vlan_tci=0x1000/0x1000,dl_dst=b8:27:eb:df:ae:a7,arp_op=2
    actions=push_vlan:0x8100,set_field:4196→vlan_vid, output:3
cookie=0xba5eba11, table=5,
    priority=100,arp,vlan_tci=0x1000/0x1000,dl_dst=b8:27:eb:8d:30:27,arp_op=2
    actions=push_vlan:0x8100,set_field:4296→vlan_vid, output:2

Further to this ARP handler example, any other ARP request (arp_op=1) may be sent to the bridge LOCAL port according to the following exemplary flow:

cookie=0xba5eba11, table=5, priority=100,arp,arp_op=1 actions=LOCAL

However, if a VLAN is configured, then an additional flow may be created as follows:

cookie=0xba5eba11, table=5,
    priority=105,arp,vlan_tci=0x1000/0x1000,arp_op=1 actions=pop_vlan,LOCAL Accordingly, all other ARP packets may be dropped according to the following exemplary flow:

cookie=0xba5eba11, table=5, priority=5 actions=drop

In an exemplary embodiment, a primary role of MAC security table 1006 is to only allow packets with known MAC addresses. In one example, MAC security sub-flows may be expressed as follows:

cookie=0xba5eba11, table=10, priority=200,dl_src=b8:27:eb:df:ae:a7 actions=goto_table:20
cookie=0xba5eba11, table=10, priority=200,dl_src=b8:27:eb:8d:30:27 actions=goto_table:20
cookie=0xba5eba11, table=10, priority=200,dl_src=b8:27:eb:19:11:87 actions=goto_table:20
cookie=0xba5eba11, table=10, priority=200,dl_src=b8:27:eb:ab:41:12 actions=goto_table:20

In this example, each of the MAC addresses in these MAC security sub-flows have been taken from the "device-mac" field from the "connected-devices" Micronets container. Accordingly, any remaining packets may be sent to the controller as a PacketIn according to the following exemplary flow:

cookie=0xba5eba11, table=10, priority=5 actions=CONTROLLER:40

As described above, packets that are received with unknown MAC addresses may be sent to the controller as a PacketIn, such the controller is enabled to create a Quench flow to drop all subsequent packets of the same type. In one example, a MAC Security Quench sub-flow may be expressed as follows:

cookie=0xf005ba11, table=10, idle_timeout=120,
    priority=250,dl_src=00:11:22:33:44:66
    actions=drop Further to this example, all such Quench sub-flows may have the cookie thereof set to "foosball," for easy identification, and also include the inactivity timeout for automatically deletion capability. In some instances, it is possible for certain devices to be either explicitly dropped or allowed via the DeviceMac and DeviceIP flows in MAC security table 1006. Accordingly, an exemplary MAC security sub-flow of a DeviceMac filter, for explicitly allowing matching packets by sending the packets to source Micronet Mapper table 1008, may be expressed as follows:

cookie=0xba5eba11, table=10, priority=275,dl_src=11:22:33:44:55:88 actions=goto_table:20

In contrast, an exemplary sub-flow for a DeviceIp filter configured to explicitly drop matching packets may be expressed as follows:

cookie=0xba5eba11, table=10, priority=175,ip, nw_src=192.168.5.2 actions=drop

In an exemplary embodiment, exemplary sub-flows of source Micronet Mapper table 1008 may be expressed according to:

cookie=0xba5eba11, table=20,
    priority=300,ip,nw_src=192.168.250.0/24
    actions=load:0x5b686f2d→NXM_NX_REG0[ ],go-to_table:30
cookie=0xba5eba11, table=20, priority=300,ip,nw_src=192.168.251.0/24
   actions=load:0x5b686f2e→NXM_NX_REG0[ ],go-
   to_table:30
cookie=0xba5eba11, table=20,
   priority=300,ip,nw_src=192.168.252.0/24
   actions=load:0x5b686f2f→NXM_NX_REG0[ ],go-
   to_table:30

In this example, these Source Micronet sub-flows match on the "device-ip" field from the "connected-devices" Micronets container, and map the corresponding MicronetId to Nicira Register 0, which stores the source MicronetId. An additional Source Micronet sub-flow is referred to herein as the "Source Micronet Trunk Gateway flow," and is configured to allow packets from the Trunk Gateway to be processed, by setting the default MicronetId in Nicira Register 0, which holds the Source Micronet. An exemplary Source Micronet Trunk Gateway flow may be expressed according to:

cookie=0xba5eba11, table=20,
   priority=300,ip,nw_src=10.36.32.55
   actions=load:0→NXM_NX_REG0[ ],goto_table:30

Accordingly, any remaining packets of source Micronet Mapper table 1008 may be sent to the controller as a PacketIn with, for example, the following exemplary sub-flow:

cookie=0xba5eba11, table=20, priority=5
   actions=CONTROLLER:40

As described above, packets that are received with unknown Source addresses may be sent to the controller as a PacketIn, such the controller is enabled to create a Quench flow to drop all subsequent packets of the same type. In one example, a Source Micronet Security Quench sub-flow may be expressed as follows:

cookie=0xf005ba11, table=20, idle_timeout=120,
   priority=350,ip,nw_src=192.168.1.2
   actions=drop Further to this example, all such Quench sub-flows also have the cookie set to "foosball" for easy identification, and also include the inactivity timeout.

In an exemplary embodiment, ARP handler destination Micronet Mapper table 1010 may be configured, in the case where no VLAN has been configured, to include the following Destination security sub-flows:

cookie=0xba5eba11, table=30,
   priority=500,ip,nw_dst=192.168.252.0/24
   actions=load:0x5b686f2f→NXM_NX_REG1[ ],go-
   to_table:40
cookie=0xba5eba11, table=30,
   priority=500,ip,nw_dst=192.168.250.0/24
   actions=load:0x5b686f2d→NXM_NX_REG1[ ],go-
   to_table:40
cookie=0xba5eba11, table=30,
   priority=500,ip,nw_dst=192.168.251.0/24
   actions=load:0x5b686f2e→NXM_NX_REG1[ ],go-
   to_table:40

These Destination security sub-flows match on the "device-ip" field from the "connected-devices" Micronets container, and map the corresponding MicronetId to Nicira Register 1, which stores the destination MicronetId. However, in the case where a VLAN is configured, exemplary Destination security sub-flows may be created as follows:

cookie=0xba5eba11, table=30,
   priority=500,ip,vlan_tci=0x1000/0x000,
   nw_dst=192.168.252.0/24
   actions=load:0x5b686f2f→NXM_NX_REG1[ ],set_
   field:4196→vlan_vid,goto_table:40
cookie=0xba5eba11, table=30,
   priority=500,ip,vlan_tci=0x1000/0x000,
   nw_dst=192.168.250.0/24
   actions=load:0x5b686f2d→NXM_NX_REG1[ ],set_
   field:4196→vlan_vid,goto_table:40
cookie=0xba5eba11, table=30,
   priority=500,ip,vlan_tci=0x1000/0x000,
   nw_dst=192.168.251.0/24
   actions=load:0x5b686f2e→NXM_NX_REG1[ ],set_
   field:4196→vlan_vid,goto_table:40

In an embodiment, destination Micronets Mapper table 1010 may include an additional sub-flow referred to herein as a "Destination Micronet Trunk Gateway flow", which is configured to allow packets destined for the Trunk Gateway to be processed, by setting the default MicronetId in Nicira Register 1, which holds the Destination Micronet. An exemplary Destination Micronet Trunk Gateway flow may be expressed according to:

cookie=0xba5eba11, table=30,
   priority=500,ip,nw_dst=10.36.32.55
   actions=load:0→NXM_NX_REG1[ ],goto_table:40

The preceding sub-flow may, for example, be created in the case where no VLAN is configured. However, in the case where a VLAN is configured, an exemplary Destination Micronet Trunk Gateway flow may instead be expressed as follows:

cookie=0xba5eba11, table=30,
   priority=500,ip,vlan_tci=0x1000/0x000,
   nw_dst=10.36.32.55
   actions=load:0→NXM_NX_REG1[ ],set_field:
   4196→vlan_vid,goto_table:40

In the case of packets having a Destination IP that does not map to a Micronet, the exemplary embodiments herein make the assumption that such packets are to be destined for the Internet. These packets thus may be sent to Internet Filter table 1022 according to the following exemplary sub-flow:

cookie=0xba5eba11, table=30, priority=6
   actions=goto_table:90

The preceding exemplary flow schemes advantageously utilize easily-identifiable cookies (i.e., in the exemplary embodiments) that enable simple assignment for a given system table, of the several potential resulting actions and the destination tables to which such actions apply, as well as various IDs, addresses, and/or data storage registers. The person of ordinary skill in the art will understand that the particular coding schemes illustrated herein are provided by way of example, and are not intended to be limiting. Other programming schemes, languages, and/or protocols may be used without departing from the scope herein.

According to the examples described above, tables 1002, 1004, 1006, 1008, 1010 (i.e., Tables 0 through 30, respectively) are deployed in a series of ordered priority to enable initial security determinations of whether packets are dropped or sent to the Internet. In this sense, this first series of tables may be referred to as the "security tables." Remaining packets (i.e., not dropped or sent to the Internet) may then be further scrutinized according to the ordered series of prioritized tables 1012, 1014, 1016, 1018 (i.e., Tables 40, 50, 60, 70, respectively), to determine whether devices in a first Micronet may be allowed to communicate with other devices in a second Micronet. In this sense, this second series of tables may be referred to as the "routing tables." In an exemplary embodiment, the routing table determinations may be based on the Source and Destination MicronetIds, and also on the Source and Destination MAC addresses. In some instances, the first and second Micronets may be the same Micronet (i.e., intra-micronet routing).

In an exemplary embodiment, a first routing table priority determination may be made at the Micronet-to-Micronet level. That is, a first priority level may determine whether all devices in the first Micronet may be allowed to communicate with all devices in the second Micronet. Accordingly, Micronet-to-Micronet table 1012 may include the following exemplary sub-flows:

cookie=0xba5eba11, table=40, priority=400, reg0=0x5b686f2f,reg1=0x5b686f2f
    actions=goto_table:80
    cookie=0xba5eba11, table=40, priority=400, reg0=0x5b686f2d,reg1=0x5b686f2d
    actions=goto_table:80
    cookie=0xba5eba11, table=40, priority=400, reg0=0x5b686f2e,reg1=0x5b686f2e
    actions=goto_table:80

For these sub-flows, it may be noted that the reg0 and reg1 values are the same for the each of the three exemplary flows. According to this technique, intra-micronet routing may be allowed for devices on the same micronet. In the exemplary embodiment, each Micronet that is created will include one of these flows.

In order for packets originating from, or destined to, the Trunk Gateway to continue to be processed, Micronet-to-Micronet table 1012 may further include sub-flows for handling the default Source and Destination Micronet IDs, and also for sending the packets to Micronet egress table 1020. Accordingly, Micronet-to-Micronet table 1012 may include the following sub-flows for such purposes:

cookie=0xba5eba11, table=40, priority=400,reg0=0
    actions=goto_table:80
    cookie=0xba5eba11, table=40, priority=400,reg1=0
    actions=goto_table:80

In this example, packets that do not match in Micronet-to-Micronet table 1012 may be sent to Micronet-to-device table 1014 (i.e., allowed micronet2device routing) for continued processing according to the following exemplary sub-flow:

cookie=0xba5eba11, table=40, priority=5
    actions=goto_table:50

In an exemplary embodiment, a second level of routing priority may be determined at the Micronet-to-device level within Micronet-to-device table 1014, which may include the following exemplary sub-flow:

cookie=0xba5eba11, table=50,
      priority=400,reg0=0x5ae9db67,dl_dst=b8:27:eb:df:ae:a7
    actions=goto_table:80

In this example, Micronet-to-device table 1014 is illustrated to use the Source Micronet ID (reg0) and the destination MAC address to determine whether any device in the Source (i.e., first) Micronet may communicate with the destination device (e.g., in the second, Destination Micronet). Accordingly, packets that do not match in this table may be sent to device-to-Micronet table 1016 (i.e., allowed device2micronet routing) for continued processing according to the following exemplary sub-flow:

cookie=0xba5eba11, table=50, priority=5
    actions=goto_table:60

In an exemplary embodiment, a third level of routing priority may be determined at the device-to-Micronet level within device-to-Micronet table 1016, which may include the following exemplary sub-flow:

cookie=0xba5eba11, table=60,
      priority=400,reg1=0x5ae9db68,dl_src=11:22:33:44:55:11
    actions=goto_table:80

In this example, device-to-Micronet table 1016 is illustrated to use the Source MAC address and the Destination Micronet ID (reg1) to determine whether a particular device in the Source Micronet may communicate with any device in the Destination Micronet. Accordingly, packets that do not match in this table may be sent to device-to-device table 1018 (i.e., allowed device2device routing) for continued processing according to the following exemplary sub-flow:

cookie=0xba5eba11, table=60, priority=5
    actions=goto_table:70

In an exemplary embodiment, a fourth level of routing priority may be determined at the device-to-device level within device-to-device table 1018, which may include the following exemplary sub-flow:

cookie=0xba5eba11, table=70,
      priority=400,dl_src=11:22:33:44:55:11,dl_dst=11:22:33:44:55:11
    actions=goto_table:80

In this example, device-to-device table 1018 is illustrated to use the Source MAC address and the Destination MAC address to determine whether two particular devices (e.g., from the Source Micronet and the Destination Micronet, respectively) may be allowed to communicate with each other. In this manner, to individual devices may be enabled to communicate with each other in different Micronets, even in the case where the security levels of the Micronets do not otherwise permit such communication. Accordingly, packets that do not match in this table (i.e., the device is trying to perform some sort of forbidden routing) may be sent to the controller as a PacketIn according to the following exemplary sub-flow:

cookie=0xba5eba11, table=70, priority=5
    actions=CONTROLLER:40

In the case of such forbidden routing, device-to-device table 1018 may be further configured to include a sub-flow referred to herein as a "Forbidden Routing Quench flow." In the exemplary embodiment, the controller is enabled to create Forbidden Routing Quench flows to drop all subsequent packets of the same type. In this example, all such Quench flows, similar to the examples described above, may have the respective cookie set to "foosball" and include an inactivity timeout, which may be expressed as follows:

cookie=0xf005ba11, table=70, idle_timeout=120,
      priority=350,ip,nw_src=192.168.1.2
    actions=drop In an exemplary embodiment, Micronet egress table 1020 may be configured to include one flow for each device in the table, and also to send the packets to the relevant device via the bridge port of that device. In this example, the "device-ip" field and the "device-openflow-port" field are taken from the "connected-devices" Micronets container. In an embodiment, these fields may then be used to populate the following exemplary flows for Micronet egress table 1020:

cookie=0xba5eba11, table=80, priority=620,ip, nw_dst=192.168.252.3 actions=output:4
    cookie=0xba5eba11, table=80, priority=620,ip, nw_dst=192.168.252.2 actions=output:4
    cookie=0xba5eba11, table=80, priority=620,ip, nw_dst=192.168.251.2 actions=output:3
    cookie=0xba5eba11, table=80, priority=620,ip, nw_dst=192.168.250.2 actions=output:2

Additionally, Micronet egress table 1020 may be further configured to include additional sub-flows to allow packets to be sent to the Micronet Gateway IP (e.g., one such sub-flow created per Micronet), which may be expressed as follows:

cookie=0xba5eba11, table=80, priority=620,ip, nw_dst=192.168.252.1 actions=LOCAL
cookie=0xba5eba11, table=80, priority=620,ip, nw_dst=192.168.251.1 actions=LOCAL
cookie=0xba5eba11, table=80, priority=620,ip, nw_dst=192.168.250.1 actions=LOCAL Micronet egress table 1020 may be further configured to include sub-flows referred to herein as "Micronet Egress Trunk Source flows" and "Micronet Egress Trunk Destination flows," respectively. In the exemplary embodiment, these Trunk sub-flows enable packets to egress from the Trunk Gateway IP, and may be expressed according to the following exemplary flows:
cookie=0xba5eba11, table=80, priority=610,ip,in_port=1, nw_src=10.36.32.55 actions=LOCAL
cookie=0xba5eba11, table=80, priority=600,ip, nw_dst=10.36.32.55 actions=LOCAL Additionally, any other packets that do not match in Micronet egress table 1020 may be dropped with the following exemplary sub-flow:
cookie=0xba5eba11, table=80, priority=5 actions=drop In an exemplary embodiment, Internet filter table 1022 may be configured to control if and how devices may navigate the Internet. The following description enumerates, by way of example and not in a limiting sense, several navigation options. In each exemplary option though, it may be noted that the nw_src field of the following Internet filter sub-flows is taken from the "device-ip" field from the "connected-devices" Micronets container.

Include one flow for each device in the table, and also to send the packets to the relevant device via the bridge port of that device. In this example, the "device-ip" field and the "device-openflow-port" field are taken from the "connected-devices" Micronets container. In in the case where only an IP filter is specified, the following exemplary sub-flow for Internet filter table 1022 may be created with all layer 4 (L4) port filter protocols being allowed to the specified IP filter:
cookie=0xba5eba11, table=90,
 priority=705,ip,nw_src=192.168.1.3,
  nw_dst=192.168.100.50
 actions=goto_table:100

However, in the case where both an IP filter and an L4 port filter are specified, the following exemplary sub-flows for Internet filter table 1022 may be created:
cookie=0xba5eba11, table=90,
 priority=710,icmp,nw_src=192.168.1.3,
  nw_dst=192.168.200.60
 actions=goto_table:100
cookie=0xba5eba11, table=90,
 priority=710,udp,nw_src=192.168.1.3,
  nw_dst=192.168.200.60,tp_dst=8000
 actions=goto_table:100
cookie=0xba5eba11, table=90,
 priority=710,tcp,nw_src=192.168.1.3,
  nw_dst=192.168.200.60,tp_dst=8000
 actions=goto_table:100

In this example, it may be noted that individual sub-flows are created for each of ICMP, UDP, and TCP. In the case though, where only an L4 port filter is specified, the following exemplary sub-flows for Internet filter table 1022 may be created to allow L4 traffic to any IP:
cookie=0xba5eba11, table=90,
 priority=710,icmp,nw_src=192.168.2.2
 actions=goto_table:100
cookie=0xba5eba11, table=90,
 priority=710,udp,nw_src=192.168.2.2,tp_dst=8080
 actions=goto_table:100
cookie=0xba5eba11, table=90,
 priority=710,tcp,nw_src=192.168.2.2,tp_dst=8080
 actions=goto_table:100

However, in the case where a filter is specified without either an IP or L4 port, then Internet filter table 1022 may be configured such that all Internet traffic will be blocked for the relevant device according to the following exemplary sub-flow:
cookie=0xba5eba11, table=90,
 priority=700,ip,nw_src=192.168.1.2
 actions=CONTROLLER:40

Accordingly, all other Internet-bound traffic may be allowed with the following exemplary sub-flow:
cookie=0xba5eba11, table=90, priority=5
 actions=goto_table:100

In an exemplary embodiment of Internet filter table 1022, an additional sub-flow may be created that is referred to herein as an "Internet Filter Quench flow." In this example, the controller is enabled to create the Internet Filter Quench flows to drop all subsequent packets of the same type. Accordingly, all such Quench flows, similar to the above examples, may have the respective cookie set to "foosball" and include an inactivity timeout, which may be expressed as follows:
cookie=0xf005ba11, table=90, idle_timeout=120,
 priority=350,ip,nw_src=192.168.1.2, nw_dst=8.8.8.8
 actions=drop In an exemplary embodiment, Internet egress table 1024 may be configured, in the case where a Micronet has been configured with a VLAN, to create the following exemplary Internet egress sub-flows:
cookie=0xba5eba11, table=100,
 priority=800,vlan_tci=0x1000/0x1000
 actions=pop_vlan,LOCAL
cookie=0xba5eba11, table=100, priority=5
 actions=LOCAL However, in the case where a Micronet has not been configured with a VLAN, Internet egress table 1024 may be configured such that only the following exemplary flow is created:
cookie=0xba5eba11, table=100, priority=5
 actions=LOCAL According to the present systems and methods, techniques are also provided for tracking and control of Micronets OpenDaylight Northbound interactions. For example, as described further below in greater detail, the present embodiments enable the creation of, for example, OpenFlow flows for the Northbound configurations that are expected to be received from the Micronets Manager. The following embodiments are therefore described with respect to: (1) creation of Micronets, devices, and routing rules; (2) queries for the Micronets, devices, and routing rules; (3) deletions of Micronets, devices, and routing rules; and (4) Micronets notifications. For ease of explanation, it is assumed that, for the REST PUT messages described below, the HTTP return code is 201, which indicates that an entity has been successfully created.

In an exemplary embodiment, a Micronet may be created with a REST JSON message. It may be noted that "micronet-vlan" and "micronet-subnet-id" fields are considered optional. In this example, the "connected-devices" field, as well as several different types of inter-micronet routing, may also be considered optional. Additionally, in this case, the "ovs-manager-port" is also optional, and may default to a value of 6640 if not present.

In an exemplary embodiment, a Micronets OVS bridge may be created using the OVS manager. That is, the OVS manager may be configured to allow the micronets application to connect, and also to create the bridge as necessary, according to the following exemplary coding scheme:

$ sudo ovs-vsctl set-manager "ptcp:6640"

In the case where the Micronet at issue is the first Micronet configured on the OVS Manager, then the Micronets application may be further configured to create the bridge and the controller connection (e.g., OpenFlow protocol), as follows:

```
$ sudo ovs-vsctl show
d3f5a271-c5d0-45c1-bfde-8f0a78e28a09
    Manager "ptcp:6640"
        is_connected: true
    Bridge "brmn001"
        Controller "tcp:192.168.86.25:6653"
            is_connected: true
        Port "brmn001"
            Interface "brmn001"
                type: internal
    ovs_version: "2.9.1"
```

Accordingly, in some cases, the creation of subsequent Micronets toward the same OVS manager may result in the creation of additional bridges. In other cases, the same bridge may be used that has been already created.

In an exemplary embodiment, Micronet OpenFlow flows may be created as a result of the JSON configuration described above. The Micronets Manager may be configured to create Micronets devices using the "connected-devices" element, and it may be noted that the "device-id" field is optional in this example, and shown to be set and read by the Micronets Manager. Further to this example, the creation of Micronets devices may include the following additional exemplary flows:

cookie=0xba5eba11, table=0, priority=100,in_port=2
    actions=goto_table:10
cookie=0xba5eba11, table=5,
    priority=110,arp,arp_tpa=192.168.250.2,arp_op=1
    actions=output:2
cookie=0xba5eba11, table=5,
    priority=100,arp,vlan_tci=0x1000/0x1000,dl_dst=b8:
        27:eb:8d:30:27,arp_op=2
    actions=push_vlan:0x8100,set_field:4196→vlan_vid,
        output:2
cookie=0xba5eba11, table=10, priority=200,dl_src=b8:
    27:eb:8d:30:27 actions=goto_table:20
cookie=0xba5eba11, table=80, priority=620,ip,
    nw_dst=192.168.250.2 actions=output:2

In an exemplary embodiment, Micronet device internet filtering may be performed, and Micronet device routing to the Internet may be controlled, using an additional "internet-filters" element added to the "connected-devices" device definition. In an embodiment, such Internet filters may include without limitation one or more of the following types: (1) no filter, for which all device traffic is allowed to go to the Internet; (2) empty filter, for which no device traffic is allowed to go to the Internet (e.g., "internet-filters": [{"filter-name": "No device internet" }]); (3) IP filter, for which a device may only navigate to certain IP addresses (e.g., "internet-filters": [{"filter-name": "IP filter", "filter-ip": "192.168.1.2" }]); (4) L4 filter, for which a device may navigate to all IP addresses, but only to certain L4 ports (e.g., "internet-filters": [{"filter-name": "L4 filter", "filter-14-port": "80" }]); and (5) IP and L4 filter, for which a device may only navigate to certain IP addresses and L4 ports.

In an exemplary embodiment, the created Micronet device Internet filter OpenFlow flows may include the following additional exemplary flows:

cookie=0xba5eba11, table=90,
    priority=710,icmp,nw_src=192.168.250.2,
        nw_dst=192.168.100.50
    actions=goto_table:100
cookie=0xba5eba11, table=90,
    priority=710,udp,nw_src=192.168.250.2,
        nw_dst=192.168.100.50,tp_dst=8000
    actions=goto_table:100
cookie=0xba5eba11, table=90,
    priority=710,tcp,nw_src=192.168.250.2,
        nw_dst=192.168.100.50,tp_dst=8000
    actions=goto_table:100

In an exemplary embodiment, as described above with respect to FIG. 10, allowable Micronet inter-micronet routing may include without limitation one or more of the following types: (1) Micronet-to-Micronet, for which any device on a first Micronet (e.g., the present Micronet) is allowed to communicate with any device on a second Micronet; (2) Micronet-to-Device, for which any device on the first Micronet is allowed to communicate with a particular device on the second Micronet; (3) Device-to-Micronet, for which a particular device on the first Micronet is allowed to communicate with any device on the second Micronet; and (4) Device-to-Device, for which a particular device on the first Micronet is allowed to communicate with a particular device on the second Micronet. In an embodiment, all four types of exemplary inter-micronet routing may be created in a REST JSON message.

Accordingly, in the case of a Micronet-to-Micronet inter-micronet routing configuration (Micronet2Micronet), an exemplary flow may be according to:

cookie=0xba5eba11, table=40,
    priority=400,reg0=0x5ae9db68,reg1=0x5ae9db67
    actions=goto_table:80

In this example, all traffic is allowed from Src Micronet (reg0) to Dst Micronet (reg1), with an action goto the MicronetEgress table (e.g., Micronet egress table 1020) to egress to the device.

Similarly, in the case of a Micronet-to-Device inter-micronet routing configuration (Micronet2Device), an exemplary flow may be according to:

cookie=0xba5eba11, table=50,
    priority=400,reg0=0x5ae9db67,dl_dst=00:11:22:33:
        44:77
    actions=goto_table:80

In this example, all traffic is allowed from Src Micronet (reg0) to Dst Device Mac (dl_dst), with an action goto the MicronetEgress table to egress to the device.

In the case of a Device-to-Micronet inter-micronet routing configuration (Device2Micronet), an exemplary flow may be according to:

cookie=0xba5eba11, table=60,
    priority=400,reg1=0x5ae9db67,dl_src=11:22:33:44:
        55:11
    actions=goto_table:80

In this example, all traffic is allowed from Src Device MAC (dl_src) to Dst Micronet (reg1), with an action goto the MicronetEgress table to egress to the device.

In the case of a Device-to-Device inter-micronet routing configuration (Device2Device), an exemplary flow may be according to:

cookie=0xba5eba11, table=70,
    priority=400,dl_src=11:22:33:44:55:11,dl_dst=11:22:
        33:44:55:11
    actions=goto_table:80

In this example, all traffic is allowed from Src Device MAC (dl_src) to Dst Device MAC (dl_dst), with an action goto the MicronetEgress table to egress to the device.

In an exemplary embodiment, Micronet device filters may be created according to a REST JSON scheme. In an embodiment, the device filters may be generic, that is, the filters need not be specific to any particular Micronet. Additional exemplary OpenFlow flows for this Micronet device filters configuration may be created according to the following flows:

cookie=0xba5eba11, table=10, priority=275,dl_src=11: 22:33:44:55:88 actions=goto_table:20 cookie=0xba5eba11, table=10, priority=175,ip, nw_src=192.168.5.2 actions=drop

With respect to queries of the created Micronets, devices, and routing rules, in an exemplary embodiment, the expected HTTP GET result for all of the queries described herein is, for ease of explanation, set to "200 OK". the manner, the HTTP GET URL is enabled to query all Micronets in the operational data store. Thus, in the case of an OVS connection problem, the Micronets would not be created in the Operational data sub-store of the data store, but instead would be available in the Configuration data sub-store. IN some embodiments, the term "operational" in may be replaced with "config" in the URL to query the Micronets created in the Configuration data sub-store.

In an embodiment, a particular Micronet may be queried by name (e.g., Micronet_Wired_250) using a URL according to the coding scheme listed in Computer Program Listing 15, below. Therefore, in this manner, all of the devices in a particular Micronet may be queried by querying either the particular Micronet, or by querying all of the Micronets in the network. In at least one embodiment, a specific device in a Micronet may be individually queried, such as according to the exemplary querying scheme listed in Computer Program Listing 16, below. In an example, a MAC address of the device may be used as the device key.

In a similar manner, in an exemplary embodiment, the Internet filters of a device may be queried by querying the Micronet to which the device belongs.

In an exemplary embodiment, the inter-micronet routing of a Micronet may be queried by querying either the particular Micronet, or by querying all of the Micronets in the network. The query may focus on the Micronet inter-micronet routing entries according to the particular routing table level desired. For example, the key for a Micronet-to-Micronet routing entry may be a dst-micronet parameter, the key for a Micronet-to-Device routing entry may be a dst-mac parameter, the keys for a Device-to-Micronet routing entry may be dst-micronet and src-mac parameters, and the keys for a Device-to-Device routing entry may be src-mac and dst-mac parameters.

In an embodiment, Micronets device filters queries may be implemented for both MAC device filters and IP device Filters. In some embodiments, all device filters may be queried according to a URL, such as an exemplary URL. In other embodiments, a specific MAC device filter may be queried according to an exemplary URL. To query a specific IP device filter, a URL also may be used.

With respect to deletions of the Micronets, devices, or routing rules, in an exemplary embodiment, all entities may be deleted from the Configuration data sub-store, and the expected HTTP GET result may again be set to 200 OK. Accordingly, in some embodiments, all of the Micronets may be deleted using a URL, a specific Micronet may be deleted using a URL, a device may be deleted from a Micronet using a URL, and an Internet filter may be deleted from a device, for example, using a URL.

Micronet inter-micronetwork routing deletions may be performed similarly. For example, Micronet-to-Micronet routing entries in a Micronet may be deleted according to an exemplary URL, Micronet-to-Device routing entries in a Micronet may be deleted according to an exemplary URL, Device-to-Micronet routing entries in a Micronet may be deleted according to an exemplary URL, and Device-to-Device routing entries in a Micronet may be deleted according to an exemplary URL.

Micronet device filters deletions may also be performed in a similar manner. For example, all of the device filters may be deleted according to an exemplary URL, a MAC device filter may be deleted according to an exemplary URL, and an IP device filter may be deleted according to an exemplary URL.

In an exemplary embodiment, Micronets Notifications may be queried in a manner similar to other queries described above. For example, all of the Micronets Notifications (i.e., all of the currently defined Micronets Notifications) may be queried according to an exemplary URL. To query a specific Micronets Notification though, a URL may alternatively conform to an exemplary URL using, for example, the notification-id as a key.

Figure 11:
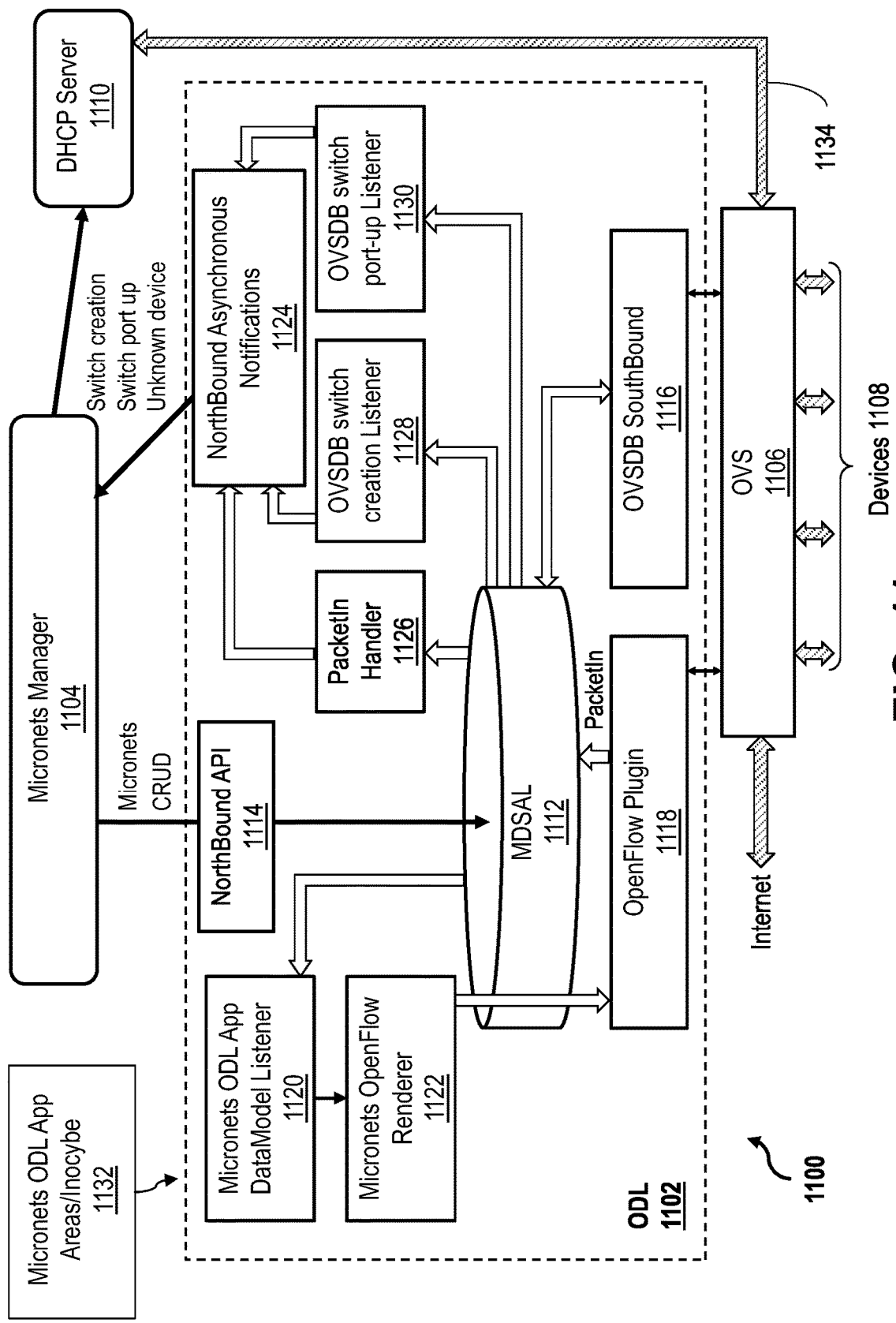
FIG. 11 is a schematic illustration of an exemplary software defined network control architecture, in an embodiment.

FIG. 11 is a schematic illustration of an exemplary SDN control architecture 1100. In an exemplary embodiment, architecture 1100 represents a system level architecture specific to implementation using an ODL-based SDN controller for an ODL application 1102. This system specific architecture though, is provided by way of example, and is not intended to be limiting. The person of ordinary skill in the art will understand how other controller solutions may be implemented without departing from the scope herein. In the exemplary embodiment depicted in FIG. 11, ODL control is uniquely implemented in the several interfaces in ODL application 1102 between a Micronets manager 1104 and the controller of ODL application 1102, an OVS switch 1106 in communication with devices 1108, and an external DHCP support server 1110.

In an exemplary embodiment, ODL application 1102 may further include an MD-SAL 1112 in communication with Micronets manager 1104 through a NorthBound API 1114. In an embodiment, ODL application 1102 may also communicate with OVS switch 1106 through a SouthBound OVSDB 1116 and an OpenFlow plugin 1118. A communication loop between MD-SAL 1112 and OpenFlow plugin 1118 may be realized using a Micronets ODL application data model listener 1120 in communication with a Micronets OpenFlow renderer 1122. An interface between MD-SAL 1112 and Micronets manager 1104 may be achieved using a NorthBound asynchronous notifications module 1124 in communication with Micronets manager 1104. A layer between MD-SAL 1112 and NorthBound asynchronous notifications module 1124 may include a PacketIn Handler 1126, an OVSDB switch creation listener 1128, and an OVSDB switch port-up listener 1130. In at least one embodiment, additional areas 1132 (Inocybe) for ODL application 1102 may be further included. In the exemplary embodiment, architecture 1100 further includes a pass-through port 1134 between OVS switch 1106 and DHCP support server 1110.

In exemplary operation of architecture 1100, ODL application 1102 functions to monitor and control Micronets ODL Application events. For example, architecture 1100 may advantageously handle both active and passive OVS Manager connections and create OVS bridges. Accordingly, when ODL application 1102 detects that a new OVS bridge has been created, it will send a message Northbound to Micronets manager 1104. That is, when ODL application 1102 detects that a new OVS bridge port has been created (e.g., OVS bridge port up), ODL application may send an asynchronous Northbound Notification to Micronets manager 1104, which in this example, is assumed to be for a new device connection.

In this example, non-DHCP packets received on the new OVS bridge port may then be dropped. Additionally, the ODL application 1102 may send an asynchronous Northbound Notification to Micronets Manager 1104 in the case where the OVS port has not been configured as a Micronets device. In the case where a device 1108 connects to an OVS bridge, the particular device 1108 may soon-after start sending DHCP messages, which may be forwarded to DHCP server 1110 via DHCP pass-through OVS port (i.e., pass-through port 1134), as configured in the Micronet creation.

Upon receiving the OVS bridge port up event, Micronets Manager 1104 may notify DHCP server 1110 with the MAC address of the particular device 1108, such that the particular device 1108 may obtain an IP address. In this example, Micronets manager 1104 may also send a configuration message to ODL application 1102 to add the newly connected device 1108 to a Micronet. The several monitoring units may then listen for testing results (e.g., a "still pending" status) that: (i) checks if a device connection is the same as an "OVS bridge port up" event; and/or (ii) verifies that new Wi-Fi connections trigger an "OVS bridge port up" event.

In further operation of architecture 1100, to remove a device from a Micronet, the Micronet ODL operational configuration may be updated. In some embodiments, the particular device 1108 may still need to obtain a new IP address. In this case, the "still pending" status may wait for testing results relevant to triggering a device 1108 to obtain a new IP address from DHCP server 1110. In some embodiments, the triggering action is handled by Micronets manager 1104 and the DHCP server 1110, where DHCP server 1110 acts to "revoke" the IP address of the particular device 1108, which in turn causes device 1108 to request a new IP address. In other embodiments, the triggering action is accomplished by bringing the OVS port down and back up, if possible, from ODL application 1102.

Also in an exemplary operation, to add a device to a Micronet, the adding event may result from the connection of a particular device to the OVS bridge, as described above. In this case, the particular device 1108 may have already obtained an IP address from DHCP server 1110, and ODL application 1102 may then need only update the Micronets connected-device configuration in the Operational data sub-store. To change a Micronet IP Subnet though, all connected devices may have already been removed from the Micronet, which event may result in a need for only a simple Configuration data sub-store update.

In the case where an unknown device is detected, either by an unknown MAC or unknown IP address, ODL application 1102 may send an Asynchronous Northbound Notification to Micronets manager 1104, and the relevant packets may be dropped until instructed to the contrary. In the case where it may be desired to allow some or all of the packets to pass for the unknown devices, Micronets manager 1104 may alternatively inform ODL application 1102 using the relevant Device Filtering data model.

Figure 12:
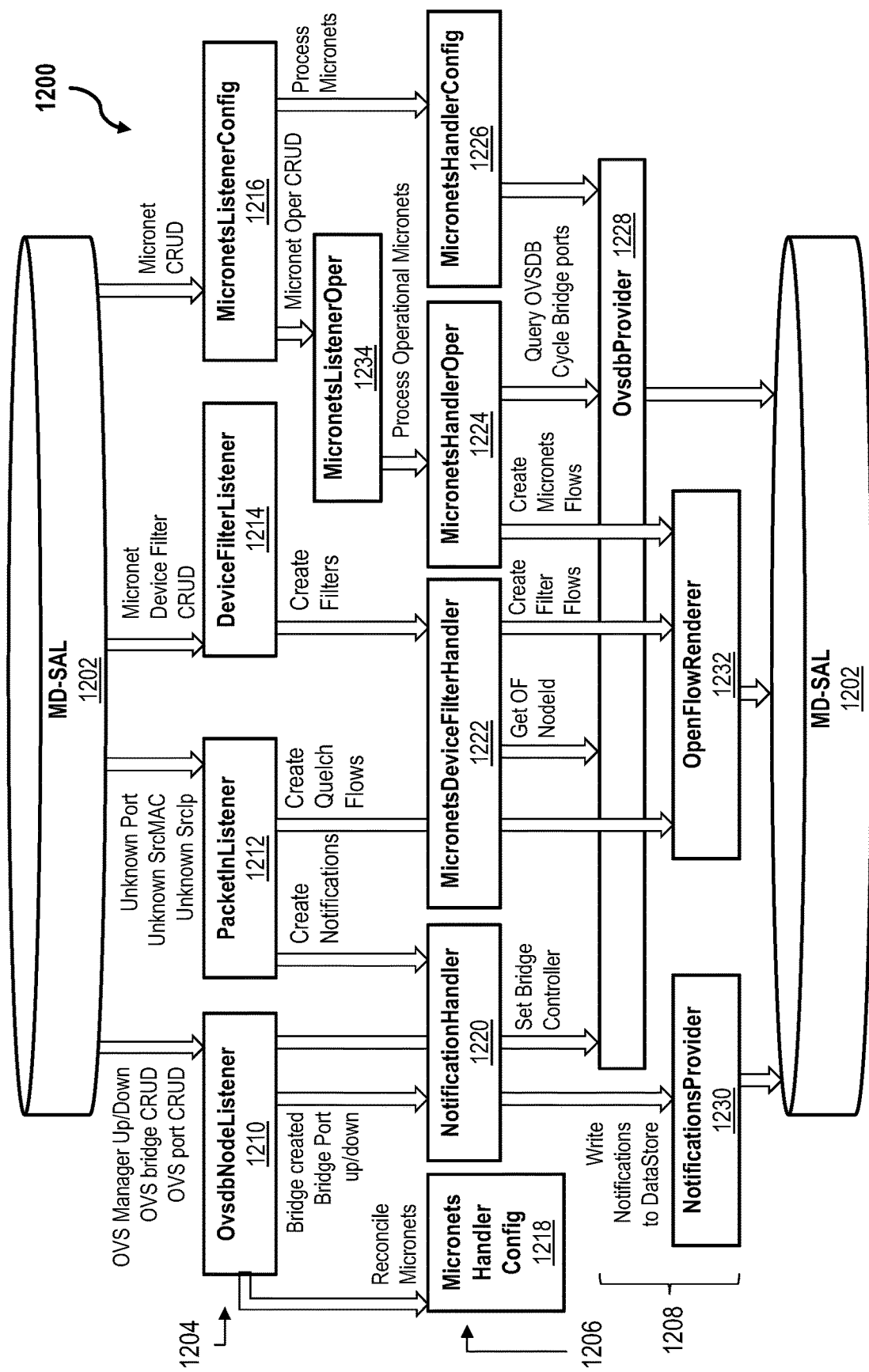
FIG. 12 is a schematic illustration of an alternative software defined network control architecture, in an embodiment.

FIG. 12 is a schematic illustration of an alternative SDN control architecture 1200. In an exemplary embodiment, architecture 1200 includes an MD-SAL 1202 similar to MD-SAL 1112, FIG. 11, and thus represents a more detailed MD-SAL implementation for an ODL-based SDN controller to support Micronets. Similar to the systems and methods described above with respect to FIG. 11, both the particular structure and the associated interfaces of architecture 1200 represent innovative improvements to SDN-controlled networks. In the example depicted in FIG. 12, MD-SAL 1202 is shown twice as a logical illustrative device. In actual implementation though, MD-SAL 1202 may be only a single device or structural element having the several interfaces described herein.

In an exemplary embodiment, architecture 1200 may include a first interface layer 1204, a second interface layer 1206, and a third interface layer 1208. First interface layer 1204 may include one or more of an OVSDB Node Listener module 1210, a PacketIn Listener module 1212, a Device Filter Listener module 1214, and a Micronets Listener Configuration module 1216.

Second interface layer 1206 may include one or more of a first Micronets Handler Configuration module 1218, a Notification Handler module 1220, a Micronets Device Filter Handler module 1222, a Micronets Handler Operations module 1224, and a second Micronets Handler Configuration module 1226. Similar to the illustrative device used in FIG. 12 to show a single instance of MD-SAL 1202 twice, in some embodiments, for illustrative purposes first Micronets Handler Configuration module 1218 and second Micronets Handler Configuration module 1226 may be the same module.

Third interface layer 1208 may include one or more of an OVSDB Provider 1228, a Notifications Provider 1230, and an OpenFlow Renderer 1232. In at least one embodiment a Micronets Listener Operations module 1234 may be further included between first interface layer 1204 and second interface layer 1206, and more particularly, between Micronets Listener Configuration module 1216 and Micronets Handler Operations module 1224. An exemplary flow diagram of the various flows described above is depicted between the several interface layers and the respective modules thereof.

Figure 13:
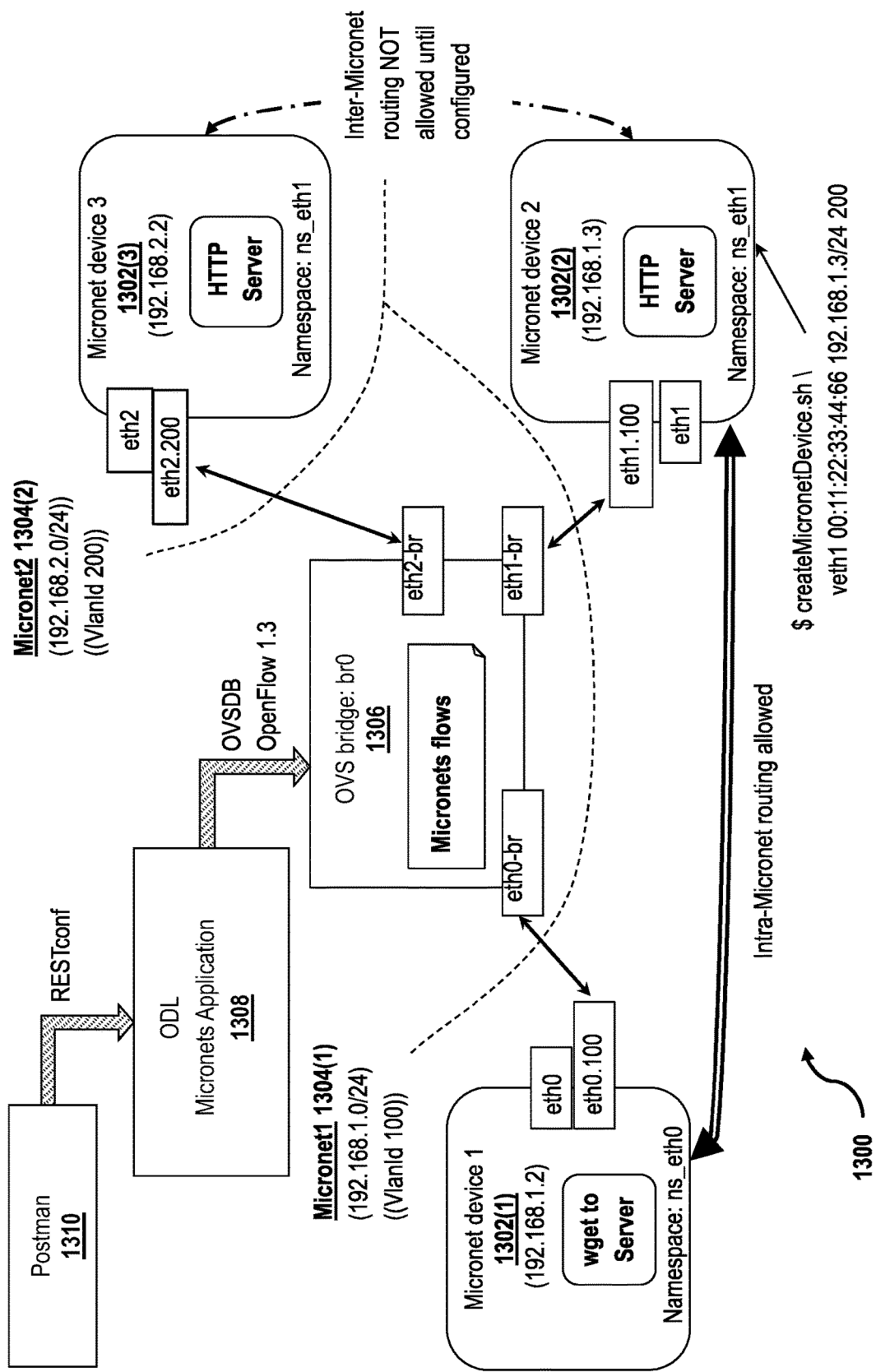
FIG. 13 is a schematic illustration of an exemplary testing system that may be implemented with one or more of the embodiments described herein.

FIG. 13 is a schematic illustration of an exemplary testing system 1300 that may be implemented with one or more of the embodiments described herein. In the exemplary embodiment, testing system 1300 was deployed for three separate Micronet devices 1302(1), 1302(2), and 1302(3), distributed among two separate Micronets 1304(1) and 1304(2). The devices were in operable communication with an OVS bridge 1306, which was itself in operable communication (e.g., receiving OVSDB OpenFlow communication) with an ODL application 1308 configured to receive RESTconf communication from a postman 1310. As illustrated in the exemplary configuration depicted in FIG. 13, intra-micronet routing was allowed between first Micronet device 1302(1) and second Micronet device 1302(2) within the same first Micronet 1304(1). In contrast inter-micronet routing was not allowed between second Micronet device 1302(2) in first Micronet 1304(1) and third Micronet device 1302(3) in separate Micronet 1304(2), at least until proper Micronet configurations are established, for example, according to the embodiments described above.

In exemplary operation of testing system 1300, the following configuration schemes were utilized:
createMicronetDevice.sh
sudo ip link add ${device_port} type veth peer name ${bridge_port}
sudo ovs-vsctl add-port ${bridge} ${bridge_port}

```
sudo vconfig add ${device_port} ${vlan_id}
sudo ip link set dev ${bridge_port} up
sudo ip netns add ${device_namespace}
sudo ip link set ${device_port} netns ${device-
   _namespace}
sudo ip link set ${device_vlan_port} netns ${device-
   _namespace}
sudo ip netns exec ${device_namespace} ifconfig
   ${device_vlan_port} ${device_ip}
sudo ip netns exec ${device_namespace} ip link set dev
   ${device_port} addr ${device_mac}
sudo ip netns exec ${device_namespace} ip link set dev
   ${device_port} up
sudo ip netns exec ${device_namespace} ip link set dev
   lo up
sudo ip netns exec ${device_namespace} ifconfig ${devi-
   ce_port} mtu 1400
```

The present embodiments are described above with respect to several components of a conventional cable and/or wireless/Wi-Fi networks. Optical networks though, are also contemplated within the scope of the present embodiments. Such optical networks may include, without limitation, an Optical Network Terminal (ONT) or Optical Line Termination (OLT), and an Optical Network Unit (ONU), and may utilize optical protocols such as EPON, RFOG, or GPON. Other types of communication systems our further contemplated, including communication systems capable of x-hauling traffic, satellite operator communication systems, MIMO communication systems, microwave communication systems, short and long haul coherent optic systems, etc.

X-hauling is defined herein as any one of or a combination of front-hauling, backhauling, and mid-hauling. In these additional embodiments, the MTS may include, without limitation, a termination unit such as an ONT, an OLT, a Network Termination Unit, a Satellite Termination Unit, a Cable MTS (CMTS), or other termination systems collectively referred to herein as "Modem Termination Systems (MTS)". Similarly, the modem described above may include, without limitation, a cable modem (CM), a satellite modem, an Optical Network Unit (ONU), a DSL unit, etc., which are collectively referred to herein as "modems." Furthermore, the DOCSIS protocol may be substituted with, or further include protocols such as EPON, RFoG, GPON, Satellite Internet Protocol, without departing from the scope of the embodiments herein.

Micronet Infrastructure for Delivering Intelligent Services to Broadband End-Points The micronet principles described above, which are enabled by SDN, establish a foundation for innovative security systems and methods based on the enhanced capabilities of network segmentation and secure network extension. Using these enhanced capabilities, the present embodiments further enable the delivery of intelligent services and business logic, including artificial intelligence (AI)-based services, using SDN (e.g., SDN controllers and SDN switches, described above) to provide new and advanced routing and security services.

In an exemplary embodiment, micronets automatically organize networks into trust domains, that is, without requiring manual configuration or limited SSIDs. The present micronet platform further enables the adaptive use of known identification techniques (e.g., addressing, fingerprinting, PKI certificates, etc.) to identify devices and dynamically segment the network location of such devices. SDN may be additionally implemented to not only identify devices, but also to collect traffic to and/or program rules into a router or AP for how the traffic should flow. As described further below, micronet implementations advantageously enable operators to provide remote end points (e.g., home owners/users) visibility and control to the dynamic network segmentation of the micronets paradigm. Moreover, use of SDN further enables opportunities to add advanced services on the Cloud.

Exemplary micronet architectural structures and system implementations are described further below with respect to FIGS. 14-17. For ease of explanation, the following embodiments refer to the networks of end point users as a "home network." The person of ordinary skill in the art will understand that this terminology is provided by way of example, and not in a limiting sense.

Figure 14:
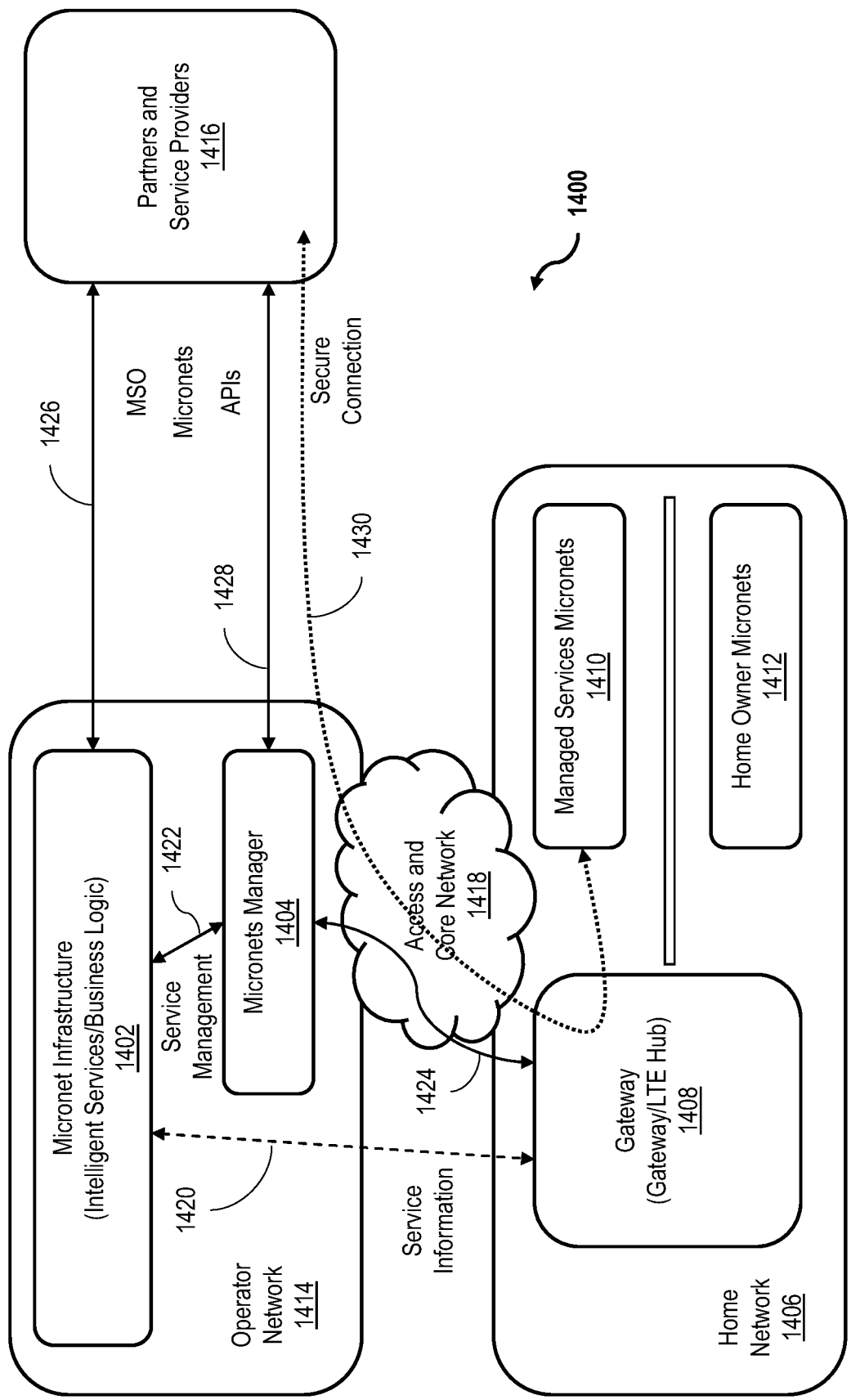
FIG. 14 is a schematic illustration of an exemplary Micronets-enabled communication system, in an embodiment.

FIG. 14 is a schematic illustration of an exemplary micronet-enabled communication system 1400. In an exemplary embodiment, system 1400 includes a micronet infrastructure 1402, a micronet manager 1404, and a home network 1406 including a gateway 1408, one or more managed services micronets 1410, and one or more home owner micronets 1412. In the example depicted in FIG. 14, micronet infrastructure 1402 and micronet manager 1404 are illustrated as being contained within an operator network 1414 (e.g. an MSO, cable operator, etc.), which is in operable communication with one or more partner/service provider subsystems 1416, and also in operable communication with home network 1406 directly, or through an access and core network 1418.

In at least one embodiment, gateway 1408 of home network 1406 is configured for operable communication with micronet infrastructure 1402 over a direct service information link 1420, with micronet manager 1404 over a first service management link 1422 through access and core network 1418. A second service management link 1424 connects micronet infrastructure 1402 and micronet manager 1404. In an embodiment, partner/service provider subsystems 1416 may operably communicate with micronet infrastructure 1402 over a third service management link 1426, and with micronet manager 1404 over a fourth service management link 1428. One or more of service management links 1422, 1424, 1426, 1428, may include an API. In at least one embodiment, partner/service provider subsystems may further be an operable communication with managed services micronets 1410 over a secure link 1430 passing through gateway 1408 in home network 1406, access and core network 1418, and possibly through operator subsystem 1414.

In the example depicted in FIG. 14, the micronets may be considered, at a high level, to structurally include several distinct architectural components, such as micronet infrastructure 1402, micronet manager 1404, and home network 1406 with gateway 1408. In exemplary operation of system 1400, micronet infrastructure 1402, which in this example is deployed by operator network 1414, includes infrastructure-oriented microservices and an intelligence layer where intelligent services and business logic are applied, which may further include AI-based services.

In an embodiment, micronet manager 1404 is the primary element of system 1404 orchestrating all micronet activities, most particularly the creation of flow rules that control switching within home network 1406 and operator network 1414 to deliver services. Home network 1406 is constituted of trust domains that are used to deliver managed services 1410 or by the owner of home network 1406 to interconnect their customer owned and managed devices or services (not shown in FIG. 14). In an embodiment, home network 1406 is further configured such that AI technologies, such as machine learning and/or neural networks, may be applied at scale, using the SDN infrastructure, to provide additional adaptive routing and security solutions.

In an embodiment, managed services micronets 1410 represent those managed services of home network 1406 that are automatically organized into appropriate micronets. The microservices of managed services micronets 1410 interact with home network 1406 through gateway 1408. Gateway 1408 may be, for example, a modem, a cable modem, a router, an LTE hub/femtocell, etc. Partner/service provider subsystems 1416 may include, for example, partners of operator network 1414 and/or third party service operators that interact with micronet manager 1404 over an API of fourth service management link 1428. In some embodiments, partner/service provider subsystems 1416 are further enabled to interact with micronet infrastructure 1402 over an API of third service management link 1426, such that partners/service provider subsystems 1416 interface with the micronets environment of operator network 1414 through the respective APIs to either or both of the intelligent services layer of micronet infrastructure 1402 and the micronets controller of micronet manager 1404.

In an embodiment, micronet infrastructure 1402 includes an intelligent services and business logic layer. The intelligent services and business logic layer may, for example, include advanced services that are enabled using cloud resources. The intelligent services and business logic layer interacts with the various elements of system 1400 through micronet manager 1404 to arrange traffic routing and connectivity. In an exemplary embodiment, micronet infrastructure 1402 is further configured to receive, e.g., through the SDN controller, information from various micronet microservices including without limitation IoT fingerprinting, AI-based traffic routing or malware detection, and mobility service management.

In an embodiment, micronet manager 1404 is configured to be responsible for orchestration and performance of overall services delivery. In at least one embodiment, the functionality of micronet manager 1404 resembles the execution of a state machine that ensures all the various system components stay synchronized. In an exemplary embodiment, micronet manager is configured to engage and manage a plurality of microservices, including without limitation the SDN controller, the DHCP server, a domain name system (DNS) server, and the AAA server.

In an embodiment, home network 1406 is configured such that the SDN switch may automatically create micronets for managed services micronets 1410, home owner micronets 1412, or for unmanaged networks or devices within home network 1406. In an exemplary embodiment, home network 1406 includes an interactive interface that enables a home user to manage network 1406, subnetworks, and micronets, which may include capabilities for manually overriding automatically created or joined networks.

In an embodiment, managed services micronets 1410 are configured such that operator network 1414 is enabled to leverage micronets of devices for managed services. Managed services micronets 1410 may therefore include organic service offerings of operator network 1414 (e.g., security services), or support services for a third party operator (e.g., a health care operator/network implementing remote patient monitoring within home network 1406). In some cases, permission(s) from the owner/user of home network 1406 may be established or required for some services of managed services micronets 1410.

In an embodiment, home owner micronets 1412 represent micronets formed in the case where, for example, home owners acquire and connects their own customer-owned and customer-managed devices. In some cases, such customer-managed devices may be integrated into complete service-oriented networks, such as a smart home lighting system. In some embodiments, these home owner networked devices may be authenticated (or fingerprinted) using an ecosystem certificate, as described above, and then automatically placed into an appropriate micronet, as described above. In at least one embodiment, the home owner is enabled to manually create a subnetwork within home network 1406 for the networked device(s). In the exemplary embodiment, connectivity is explicitly allowed by owner/authorized user of a network 1406.

In an embodiment, gateway 1408 represents a core networking component of the micronet operation. In an exemplary embodiment, gateway 1408 implements an SDN-controlled virtual switch that implements a flow table pipeline. Gateway 1408 may be further configured to support either or both of a wired and a wireless environment. Exemplary implementations of SDN control are described above.

According to the exemplary embodiment depicted in FIG. 14, the innovative micronet configuration of system 1400 provides unique interfaces to third parties, such as doctors and hospitals, to provision devices (i.e., medical devices) from the separate third party provider subsystem 1416 for home use within home network 1406, but without risking compromise to the provisioned medical device from less secure intelligent devices operating within home network 1406. In this example, the third party medical provider of the particular subsystem 1416 utilizes an API (e.g., service management links 1426, 1428) to associate a device to a client. When that client takes the device home (i.e., the location of home network 1406), the device may automatically join home network 1406 (e.g., which may include a prompt for user permission), and then automatically and securely connect to the third party provider of that subsystem 1416 over a secure connection 1430.

According to this example, the automatically joined and connected medical device may operate within home network 1406 as a secure network extension of the particular third party provider subsystem 1416, but in a segmented managed services micronet 1410 within home network 1406. Therefore, enabled by SDN, these two basic capabilities—network segmentation and secure network extension—establish the foundation of the innovative and enhanced security paradigm provided by micronets.

Figure 15:
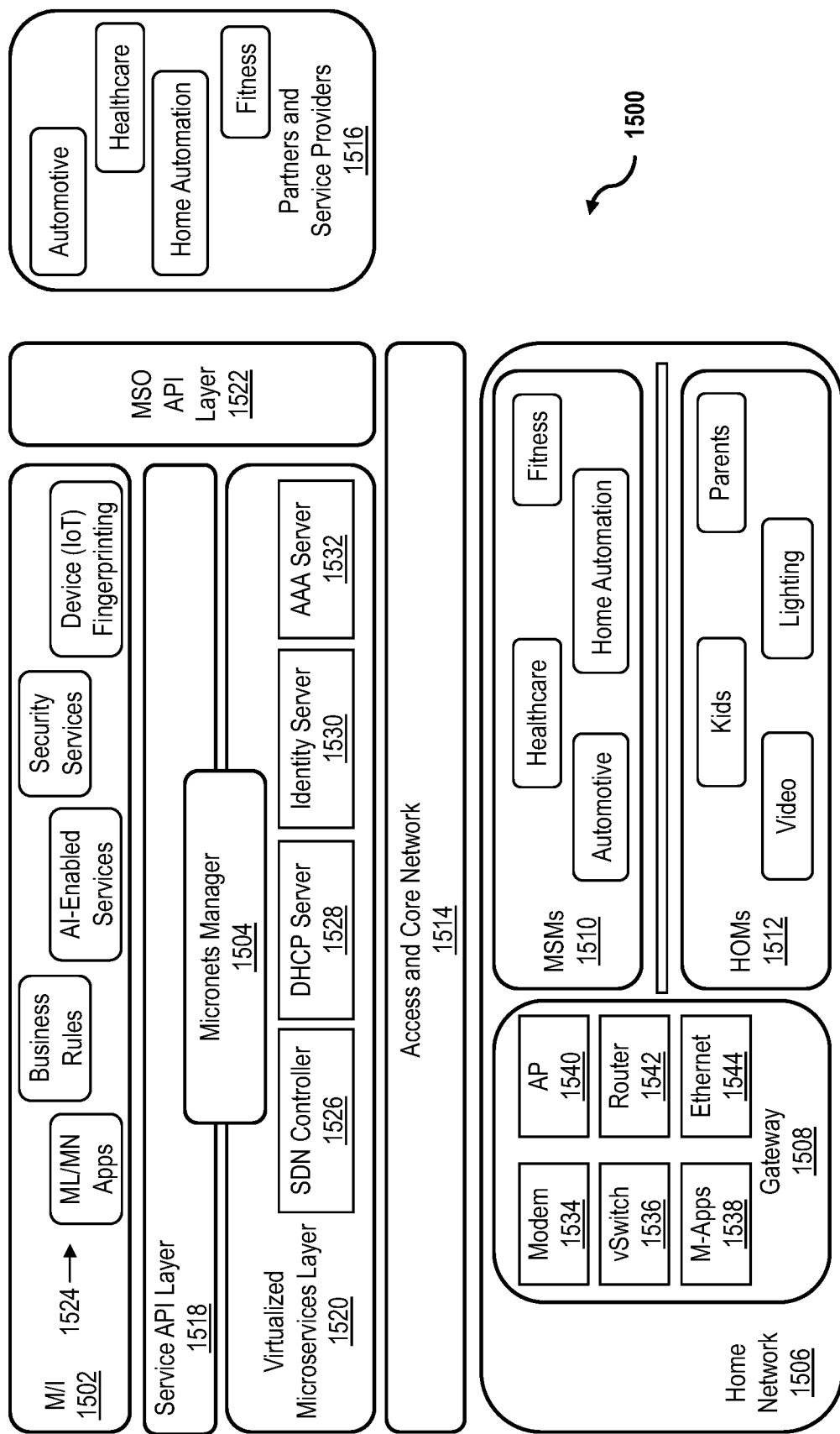
FIG. 15 is a schematic illustration of an exemplary Micronets architecture, in an embodiment.

FIG. 15 is a schematic illustration of an exemplary micronets architecture 1500. In an exemplary embodiment, architecture 1500 may be implemented within the context of a larger networking system such as system 1400, FIG. 14, and therefore may further include several elements that have similar structure and functionality, such as a micronet infrastructure 1502, a micronet manager 1504, a home network 1506 including a gateway 1508, managed services micronets 1510, and home owner micronets 1512. Also similar to system 1400, architecture 1500 functions with respect to an access and core network 1514 and partner/service provider subsystems 1516.

In an exemplary embodiment, architecture 1500 further includes a service API layer 1518 and a virtualized microservices layer 1520 between micronet infrastructure 1502 and access/core network 1514, and an MSO API layer 1522 for interfacing with partner/service provider subsystems 1516.

In the exemplary embodiment, micronet infrastructure 1502 represents an intelligent services layer configured to provide service information and/or guidance to the SDN or micronet controller to establish flow rules dynamically at the SDN switch. The intelligent services layer may include one or more advanced services 1524, such as machine learning (ML) or neural network (NN) powered applications, business logic (e.g., conditional billing), AI-enabled services, security services, and/or device (e.g., IoT) fingerprinting. These services are described by way of example, and are not intended to represent an exhaustive list.

In the exemplary embodiment, virtualized microservices layer 1520 represents a virtualized control layer for the microservices of one or more of an SDN controller 1526, a DHCP server 1528, an identity server 1530, and an AAA server 1532. In at least one embodiment, one or more of the microservices of virtualized microservices layer 1520 may be cloud services, or operate from the cloud. Gateway 1508 may thus include one or more of a modem 1534, a virtual switch 1536, a micronet application layer 1538, an AP 1540, a router 1542, and an ethernet 1544. In the example depicted in FIG. 15, the several managed services micronets 1510 of home network 1506 correspond to the respective environments of the several third party providers of partner/service provider subsystems 1516.

Figure 16:
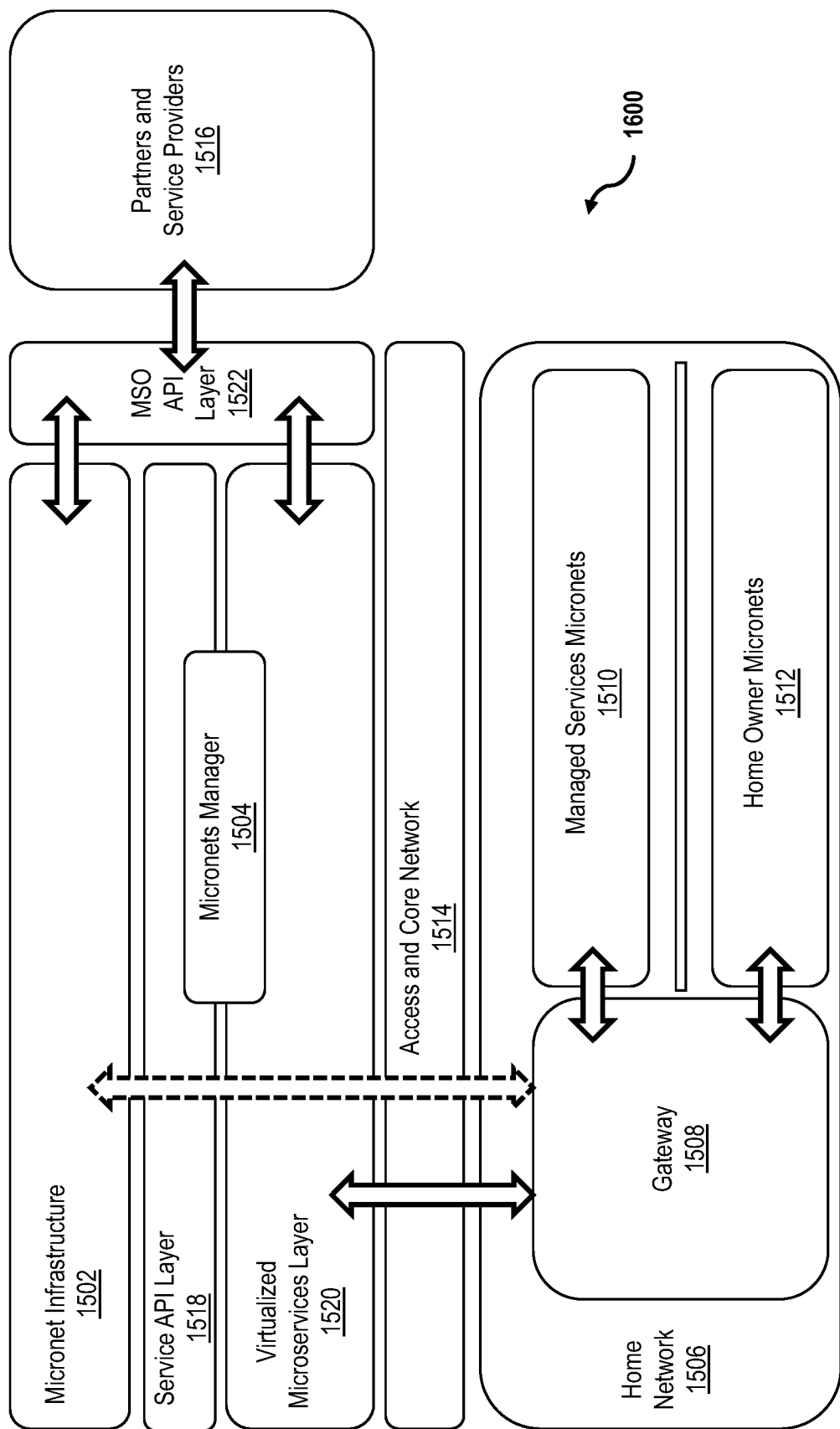
FIG. 16 is a schematic illustration depicting an exemplary operation principle of the Micronets architecture depicted in FIG. 15.

FIG. 16 is a schematic illustration depicting an exemplary operation principle 1600 of micronet architecture 1500, FIG. 15. In an exemplary embodiment, operation principle 1600 illustrates a dynamic flow configuration between the several layers, networks, managed services and micronets of architecture 1500. More specifically, according to operation principle 1600, SDN is implemented to dynamically configure flow rules and security controls (e.g., from micronet infrastructure 1502) in switches. This SDN implementation may further include providing service information (e.g., traffic information, identity information, etc.) from the network being operated (e.g., operator network 1414, FIG. 14) to advanced service processors at the business and service intelligence layer of micronet infrastructure 1502.

As further illustrated in FIG. 16, micronet infrastructure 1502 interfaces with virtualized microservices layer 1520 through service API 1518, similar to second service management link 1424, FIG. 14, and virtualized microservices layer 1520 interfaces with gateway 1508 through access/core network 1514, similar to first service management link 1422, FIG. 14. Different though, from system 1400, partners/service providers 1516 need not establish a direct service management link to each of micronet infrastructure 1502 and micronet manager 1504, but may instead communicate directly through MSO API layer 1522, and MSO API layer 1522 may then individually communicate with micronet infrastructure 1502, and also with micronet manager 1504 (e.g., through virtualized micro services layer 1520).

Figure 17:
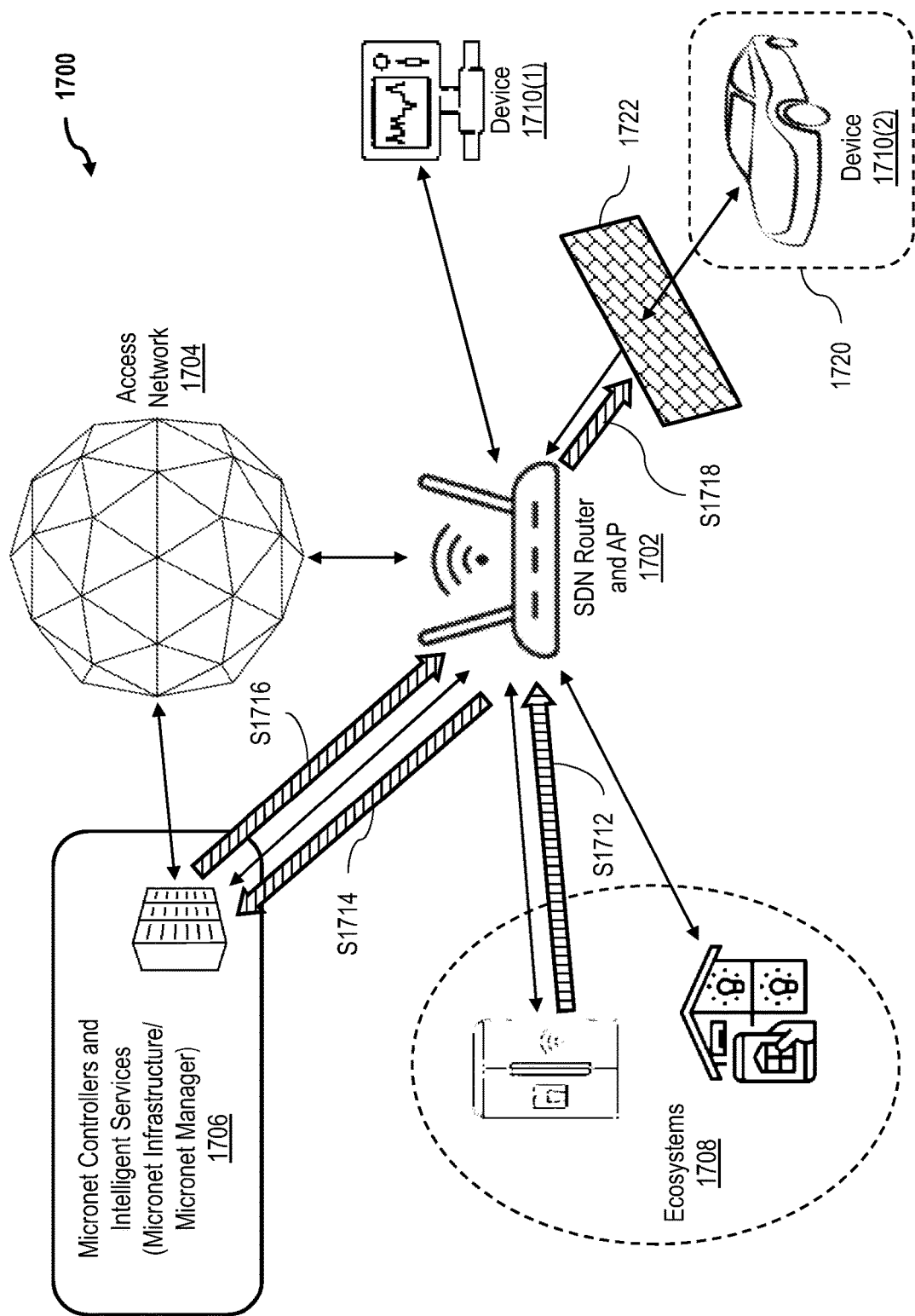
FIG. 17 is a schematic illustration of an alternative Micronets-enabled communication system, in an embodiment.

FIG. 17 is a schematic illustration of an alternative Micronets-enabled communication system 1700. Communication system 1700 is similar to system 1400, FIG. 14, and includes similar components and functionality thereto, but is viewed from the perspective of an SDN router and AP 1702. In the exemplary embodiment, SDN router/AP 1702 is a central communication *nexus* of a home network (not shown in FIG. 17), and is configured for operable functionality with one or more of an access network 1704, micronet controllers/intelligent services 1706, a plurality of ecosystems 1708, and a plurality of connected devices 1710. For the several ecosystems 1708 and devices 1710 illustrated in FIG. 17, the descriptive labels therein are provided for purposes of illustration, and are not intended to be limiting.

In exemplary operation of system 1700, router/AP 1702 is configured to, in step S1712 receive a certificate (or another identity measure) from at least one ecosystem 1708. In an exemplary embodiment of step S1712, certificates from a variety of ecosystems 1708 provide identities and usage descriptors of one or more devices 1710 within system 1700, which information may provide valuable insight into desirable network configurations. In step S1714, router/AP 1702 captures the traffic and forwards the received certificate/identity information to the business and intelligent services layer of micronet controllers/intelligent services 1706 (e.g., micronet infrastructure).

In step S1716, micronet controllers/intelligent services 1706 interprets the forwarded information (e.g., by advanced services or AI processes, such as machine learning) and communicates to the SDN controller the network configuration to implement through router/AP 1702. In an exemplary embodiment of step S1716, micronet controllers/intelligent services 1706 are further figured to interpret the information to identify devices without certificates, validate known devices, and/or monitor devices and system elements for abnormal behaviors.

In further operation of system 1700, the capture and forwarding of packets be performed using a standard API, along with other security reporting, and provided to the business and intelligent service layer to dynamically change flows, according to one or more of the embodiments described above. In some embodiments, the captured/forwarded information is communicated directly between the gateway and the business and services layer. In other embodiments, the information is provided through the SDN and management interfaces/APIs. In at least one embodiment, the information is provided through a combination of direct communication and indirect SDN interfacing.

Accordingly, in the exemplary embodiment depicted in FIG. 17, in step S1718, upon identification of an abnormal or known bad behavior by micronet controllers/intelligent services 1706 in step S1716, router/AP 702 may be further configured to dynamically place a suspect device 1710 (device 1710(2), in this example) into a special, segregated network 1720 namely, a micronet, to create a more granular "walled garden" that allows the suspect device 1710(2) to continue to operate within the network, but with a virtual wall 1722 that prevents device 1710(2) from harming other elements of the system 1700 by its continued operation therein.

Accordingly, the innovative micronet embodiments described herein enable the automatic organization of networks and subnetworks into trust domains without requiring manual configuration or limited SSIDs. The present micronet platform applies adaptive use of such advanced services as addressing, fingerprinting, and PKI certificates, to identify devices and dynamically segment the network location of such devices. Using SDN, the present systems and methods are further enabled to collect traffic to identify devices, and also to program rules into a router or AP regarding how that traffic should flow.

The present micronet embodiments further advantageously enable operators to provide home users visibility and control to the dynamic network segmentation, while also providing seamless interfaces to third-party providers to provision devices for home use, such as an API to associate a device to a client. The present embodiments therefore realize a significantly advanced network segmentation capability, along with enhanced secure network extensions, which are able to leverage still further advanced services through the micronet infrastructure and/or cloud services.

Exemplary embodiments of systems and methods for establishing and managing micro nets for electronic devices are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A communication system, comprising:
   a micronet infrastructure configured to (i) receive advance service information from the communication system, and (ii) to arrange traffic routing and connectivity of the communication system;
   a micronet manager in operable communication with the micronet infrastructure and configured to orchestrate service delivery to the communication system; and
   a user network in operable communication with the micronet manager and the micronet infrastructure, and including (i) one or more micronets, and (ii) a gateway configured to implement software defined networking (SDN) to automatically segment the one or more micronets.

2. The system of claim 1, wherein the micronet infrastructure comprises an intelligent services layer comprising advanced services including one or more of a machine learning powered application, a neural network powered application, business logic, an artificial intelligence-enabled service, a security service, and a device fingerprinting service.

3. The system of claim 1, wherein the micronet manager is further configured to manage one or more of an SDN controller microservice, a dynamic host configuration protocol (DHCP) server microservice, a domain name system (DNS) server microservice, and an authentication, authorization, and accounting (AAA) server microservice.

4. The system of claim 1, wherein the gateway comprises at least one of a modem, a virtual switch, a micronet application layer, an access point, a router, and an ethernet.

5. The system of claim 4, wherein the gateway is further configured to support at least one of a wired environment and a wireless environment.

6. The system of claim 4, wherein the gateway comprises the virtual switch, and wherein the virtual switch is configured to be controlled by the SDN to implement a flow table pipeline.

7. The system of claim 4, wherein the gateway comprises the router and the access point.

8. The system of claim 7, wherein the gateway forms a centralized communications hub between the micronet infrastructure, an access network, a plurality of ecosystems, and a plurality of connected devices.

9. The system of claim 8, wherein the micronet infrastructure is further configured to interpret certificates from the plurality of ecosystems to identify the plurality of connected devices.

10. The system of claim 9, wherein the micronet infrastructure is further configured to (i) identify that a particular device of the plurality of connected devices does not have an ecosystem certificate, and (ii) cause the gateway to establish a segregated micronet for operation of the particular device within the system.

11. The system of claim 1, wherein the micronet manager is in operable communication with the micronet infrastructure through a service application programming interface layer.

12. The system of claim 1, wherein gateway is further configured to implement SDN to automatically segment the one or more micronets into at least one user-managed micronet.

13. The system of claim 12, wherein gateway is further configured to implement SDN to automatically segment the one or more micronets into at least one system-managed micronet separate from the at least one user-managed micronet.

14. The system of claim 13, further comprising an SDN switch.

15. The system of claim 14, wherein the SDN switch is configured to automatically establish the at least one system-managed micronet to interact with and conform to provider services of a provider subsystem in communication with the user network over a secure connection.

16. The system of claim 15, wherein the provider subsystem in further in operable communication with the micronet manager, the micronet infrastructure, and the gateway.

17. The system of claim 16, wherein the provider subsystem is further in operable communication with the micronet manager and the micronet infrastructure through a multiple service operator (MSO) application programming interface layer (API).

18. The system of claim 17, wherein the micronet manager and the micronet infrastructure are contained within an MSO network.

19. The system of claim 1, wherein the user network is in operable communication with the micronet manager through an access and core network.

20. The system of claim 1, wherein the user network is in operable communication with the micronet infrastructure through a service information link.

* * * * *